United States Patent [19]

Ivy

[11] Patent Number: 4,738,161
[45] Date of Patent: Apr. 19, 1988

[54] STEERABLE DIFFERENTIAL AND STEERING ASSEMBLY FOR A VEHICLE

[76] Inventor: Jessie T. Ivy, 686 W. Shore Dr., Anacortes, Wash. 98221

[21] Appl. No.: 893,569

[22] Filed: Aug. 5, 1986

[51] Int. Cl.[4] ............................................. F16H 1/445
[52] U.S. Cl. .................................. 74/710; 74/665 T; 180/6.7
[58] Field of Search ...................... 180/6.2, 6.32, 6.34, 180/6.38, 6.4, 6.62, 6.64, 6.7; 74/665 T, 665 GC, 665 S, 665 K, 695, 700, 710, 713, 740, 785

[56] References Cited

U.S. PATENT DOCUMENTS

| Re. 14,938 | 8/1920 | White | 180/6.7 |
|---|---|---|---|
| 1,317,075 | 9/1919 | Couse | 74/710 X |
| 1,319,367 | 10/1919 | Weidely | 74/710 X |
| 2,394,119 | 2/1946 | Tomik | 180/6.7 X |
| 2,815,974 | 12/1957 | Stubbe | 74/785 X |
| 3,351,149 | 11/1967 | Lundin et al. | 180/6.7 |
| 3,439,559 | 4/1969 | Binger et al. | 180/6.7 X |
| 3,461,744 | 8/1969 | Booth | 180/6.7 X |
| 4,090,416 | 5/1978 | Hicks | 74/785 |
| 4,377,094 | 3/1983 | Thompson et al. | 180/6.7 X |
| 4,497,218 | 2/1985 | Zaunberger | 180/6.7 X |

FOREIGN PATENT DOCUMENTS

| 1480532 | 4/1969 | Fed. Rep. of Germany | 180/6.7 |
|---|---|---|---|
| 1913011 | 9/1970 | Fed. Rep. of Germany | 180/6.7 |
| 670026 | 11/1929 | France | 180/6.2 |
| 33436 | 3/1979 | Japan | 180/6.2 |
| 35865 | 6/1950 | Poland | 180/6.2 |
| 83296 | 4/1935 | Sweden | 180/6.7 |

Primary Examiner—Lawrence Staab
Assistant Examiner—Dwight G. Diehl
Attorney, Agent, or Firm—Hughes, Cassidy & Multer

[57] ABSTRACT

A vehicle steerable differential which includes a cage which encloses a differential unit in a manner that rotation of the cage drives wheeled or tracked axles to propel the vehicle. The axles are operatively engaged to respective spur gears via intermediate roller gears. If there is no braking pressure applied to either one of the spur gears by a manual steering brake, the spur gears rotate with the cage and the vehicle maintains its direction of travel. If a braking force is applied to one of the spur gears however, causing its rotational velocity to slow relative to the cage, the intermediate roller gear which is engaged to the slowed spur gear is caused to rotate thereby increasing the rotational velocity of the corresponding axle and causing the vehicle to turn. The rotational velocity of the opposing axle is reduced by means of the differential unit. A quick turn is initiated by a quick turn assembly which causes a selected one of the spur gears to stop its rotation. The resulting increase in the velocity of the axle corresponding to the nonrotating spur gear causes the opposing axle to slow down and rotate in an opposite direction to turn the vehicle in a rapid manner. An antispin assembly is provided for delivering a positive driving force to both axles in the event that the rotation of one of the vehicle tracks is impeded and the other track is caused to spin due to a substantial difference in the coefficients of friction between the ground and the tracks. The antispin assembly causes a reduction in the rotational velocity of the spur gear on the nonspinning side so as to decrease the velocity of the spinning axle and to generate a driving force to the nonspinning axle.

9 Claims, 16 Drawing Sheets

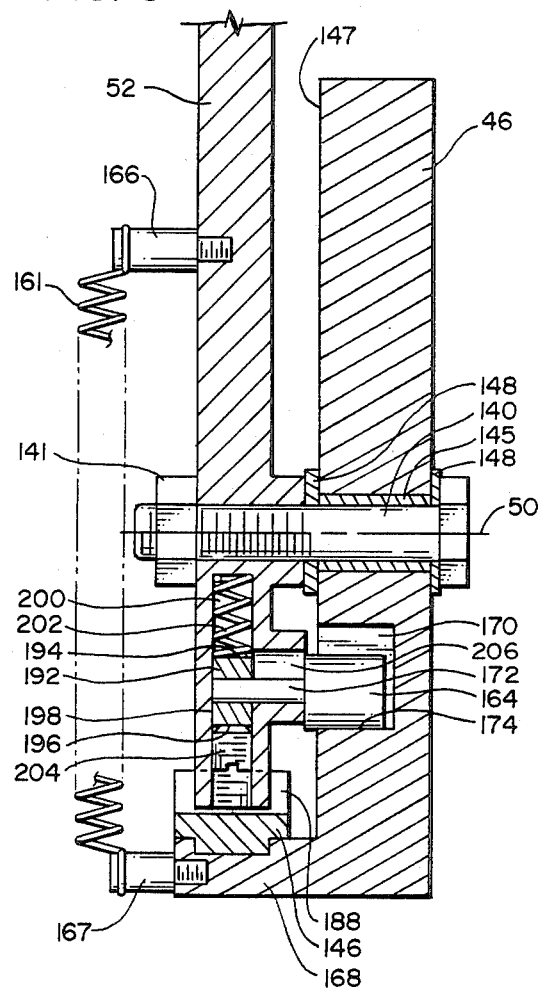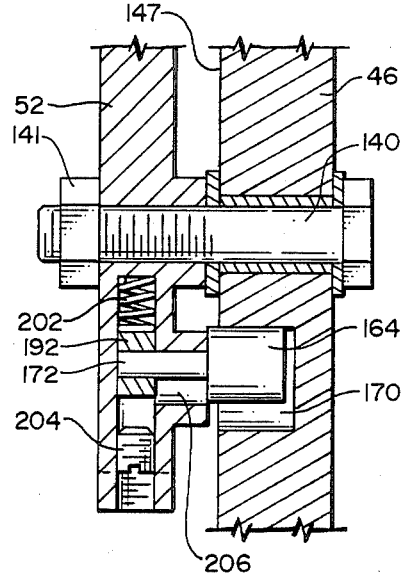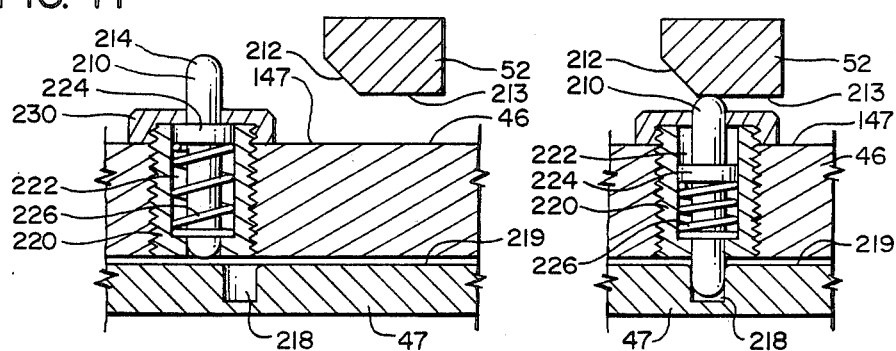

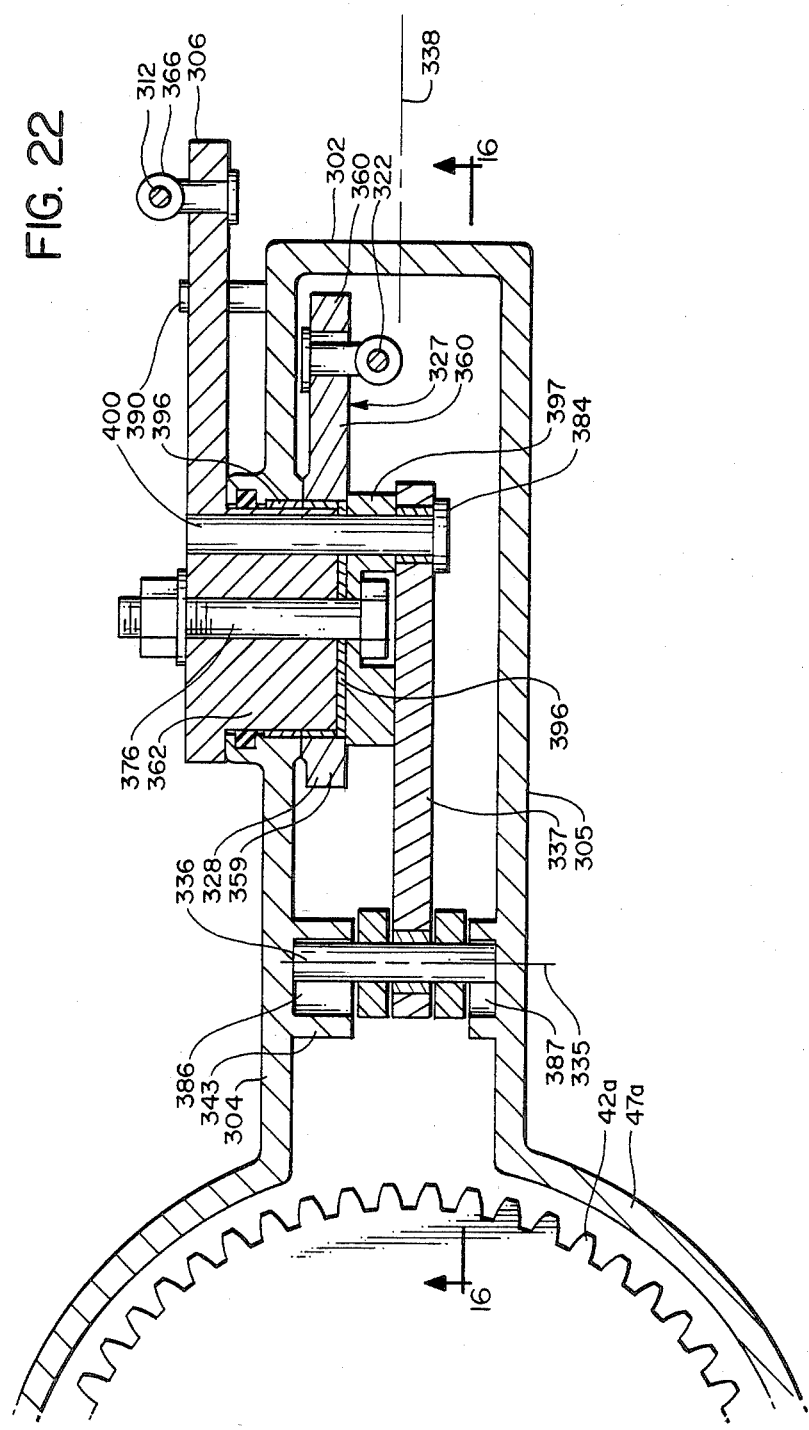

STEERABLE DIFFERENTIAL AND STEERING ASSEMBLY FOR A VEHICLE

TECHNICAL FIELD

The present invention pertains to a steering mechanism and to a differential gear assembly which is steerable in a desired turning direction.

BACKGROUND OF THE INVENTION

Tracked vehicles such as military tanks and bulldozers have been steered in a conventional manner by a clutch and brake assembly associated with each track of the vehicle. A turning maneuver was performed conventionally by the driver by disengaging the clutch to the track located on the side toward the inside of the turn, and engaging the clutch on the track located towards the outside of the turn. The greater rotational velocity of the outside track as compared to the inside track caused the vehicle to make a curving turn. Sharper turns were accomplished by braking the inside track so that there was very little or no rotation of this track relative to the outside track.

Other conventional apparatus for turning a tracked vehicle have been disclosed. In U.S. Pat. No. 1,253,319 by White, which was reissued as U.S. Pat. No. Re. 14,938, there is disclosed a differential gear for a tracked vehicle which is caused to turn in a right or left direction by application of a braking pressure which causes the braked side of the differential and its corresponding axle to slow down and the unbraked side of the differential and its corresponding axle to speed up.

A power transmission and steering control mechanism for a tracked vehicle is disclosed in U.S. Pat. No. 2,336,912 by Zimmerman, which includes separate differentials for each track which are selectively driven by a third differential.

In Orshansky, U.S. Pat. No. 2,393,557, a differential steering gear for a tracked vehicle was disclosed wherein steering was effected by changing the relative velocity of the tracks by means of a variable volume output hydraulic unit.

Neklutin disclosed a steering mechanism for a tracked vehicle in U.S. Pat. No. 2,763,164, which included a variable speed motor which acted through a differential gear to cause differing rotational velocities of opposing drive shafts to cause a vehicle to turn in a desired direction.

U.S. Pat. No. 3,351,149 by Lundin et al, disclosed a steering mechanism for a tracked vehicle in which opposing right and left shafts for driving the tracks were engaged to a hydraulically driven steering shaft which generated additive and subtractive forces to the drive shafts to cause the vehicle to turn.

Binger et al, disclosed a steering gear for a tracked vehicle in U.S. Pat. No. 3,439,559, wherein the vehicle was turned by a control mechanism which drove the opposing tracks at differential speeds.

In U.S. Pat. No. 3,461,744 by Booth, a steering system for a tracked vehicle was disclosed which utilized a hydraulic system including separate motors/pumps for each track, the outputs being separately adjusted to cause the velocity of one of the tracks to increase and the velocity of the opposing track to decrease thereby turning the vehicle in the selected direction.

A steering differential and braking system for a tracked vehicle was disclosed in U.S. Pat. No. 4,377,094 by Thompson et al, wherein a braking gear on each of two braking axles was used with a differential gear so that a drive input to the differential was divided in a manner that one side of the differential was slowed and the opposing side was speeded up.

In addition to the aforementioned conventional steering apparatus, Ivy in U.S. Pat. No. 2,278,880, disclosed a gearing system for receiving a drive input and for driving an output shaft at selected gear ratios.

SUMMARY OF THE INVENTION

The present invention pertains to a steerable differential which in combination with a steering brake is utilized to turn a vehicle, e.g. a tracked vehicle such as a tank, in a left or right direction.

The steerable differential includes an outer housing which encloses a cage which in turn encloses a conventional differential unit in a manner that rotation of the cage about a main axis drives wheeled left, right axles engaged to the differential unit to move the vehicle in a linear path. The steerable differential includes a number of planetary gears which are rotatably engaged (i) to left, right internal sun gears which in turn are engaged to the differential axles, and (ii) to internal spurs of left, right annular spur gears. The planetary gears are engaged to the cage for movement therewith along an annular path. During operation of the steerable differential where it is desired to move the vehicle along a linear path, the planetary gears travel along the aforementioned annular path without rotation about their axes, while the sun gears and the spur gears rotate with the cage.

However, if the steering brake is brought into engagement with the left spur gear, for example, the rotational velocity of the left spur gear is reduced relative to the cage, and the left planetary gears are caused to rotate about their respective axes. This causes an increase in rotational velocity of the left sun gear and corresponding increase in the rotational velocity of the left axle. This increase in rotational velocity of the left axle generates a reduction in the rotational velocity of the right axle via the differential unit to cause the vehicle to turn to the right.

The steering brake applies a braking force to the selected spur gear by means of a vertical handle having a pinion which is engaged to a geared rack. The handle is also pivotally connected to a vertical flange, which in turn is pivotally connected to the outer housing, and to which left and right braking pinions are connected. Movement of the handle to the right, for example, causes the left end of the flange to tilt downward thereby causing the left braking pinion to engage the left spur gear of the steerable differential. At the same time, the rack moves laterally into engagement with the shaft of the left braking pinion thereby slowing the rotational velocity of the left spur gear of the steerable differential. This causes the vehicle to turn to the right in the manner discussed previously.

More particularly, there is provided in a vehicle having a lengthwise axis and a transverse axis which is perpendicular to the lengthwise axis, an apparatus for receiving a drive input and for generating a drive output in response to the drive input in a manner to propel to the vehicle in a selected direction. The apparatus includes cage means which are operatively connected to the vehicle for rotation, in response to the drive input, about a first axis which has a substantial alignment component which is parallel to the transverse axis.

First and second axle means rotate about the first axis in a manner to generate the drive output for propelling the vehicle in the selected direction. Also included are differential gear means which are operatively connected to the cage means in a manner that rotation of the cage means about the first axis at a first rotational velocity causes the differential gear means to rotate about the first axis. The differential gear means are also operatively connected to the first and second axle means in a manner that the rotation of the differential gear means causes the rotation of the first and second axle means to propel the vehicle. The present invention also includes first and second outer gear means which rotate about the first axis. First and second intermediate gear means are provided which are operatively connected to the cage means for axial rotation about a second axis which has a substantial alignment component which is parallel to the transverse axis. The first and second intermediate gear means are engaged to the first and second axle means, respectively, in a manner that axial rotation of the first intermediate gear means about the second axis causes an increase in the rotational velocity of the first axle means to cause the vehicle to turn in a first direction, and axial rotation of the second intermediate gear means about the second axis causes an increase in the rotational velocity of second axle means to cause the vehicle to turn in a second direction. In addition, the first and second intermediate gear means are engaged to the first and second outer gear means, respectively, for operation in a first non-steering mode in which the first and second outer gear means are caused to rotate about the first axis at a first rotational velocity and the first and second intermediate gear means are characterized by their nonrotation about the second axis. For operation in a second steering mode, (i) the first outer gear means is caused to rotate at a velocity which is less than the first rotational velocity to cause the first intermediate gear means to rotate about the second axis and to cause the increase in the rotational velocity of the first axle means thereby causing the vehicle to turn in the first direction, and (ii) the second outer gear means is caused to rotate at a velocity which is less than the first rotational velocity to cause the second intermediate gear means to rotate about the second axis and to cause the increase in the rotational velocity of the second axle means and thereby cause the vehicle to turn in the second direction.

In another embodiment of the present invention, the apparatus includes means for reducing the rotational velocity of (i) the first outer gear means below the first rotational velocity to turn the vehicle in the first direction, and (ii) for reducing the rotational velocity of the second outer gear means below the first rotational velocity to turn the vehicle in the second direction.

In an exemplary embodiment, the velocity reducing means comprises actuating means including a base having a first end and a second end, and a handle which is connected to the base for movement in a first direction which has a substantial alignment component which is parallel to said transverse axis, and a second direction which is generally opposite to said first transverse direction. First and second braking gear means are provided which are connected to the first and second ends of the base, respectively, and which engage the first and second outer gear means, respectively, to reduce the rotational velocity of the first and second outer gear means. Also provided are means for mounting the base to the vehicle in a manner that (i) movement of the handle in the first transverse direction causes the second end of the base to descend in a manner that the second braking means engages the second outer gear means to reduce the rotational velocity of the second outer gear means and to cause the vehicle to turn in the first direction, and (ii) movement of the handle in the second direction causes the first end of the base to descend in a manner that the first braking means engages the first outer gear means to reduce the rotational velocity of the first outer gear means and to cause the vehicle to turn in the second direction.

In another embodiment there is also provided means for stopping the rotation of the first outer gear means to quickly turn the vehicle in the first direction, and for stopping the rotation of the second outer gear means to quickly turn the vehicle in the second direction. The stopping means include first wedge means for engaging the first outer gear means in a manner to stop the rotation of the first outer gear means, and a second wedge means for engaging the second outer gear means in a manner to stop the rotation of the second outer gear means. Also included are wedge actuating means including a first arm having a first end to which the first wedge means is operatively connected, and a second end to which the second wedge means is operatively connected. The wedge actuating means also includes first arm support means for supporting the first arm in a manner that when the first wedge means is engaged with the first outer gear means, the second wedge means is disengaged frcm the second outer gear means, and when the second wedge means is engaged with the second outer gear means, the first wedge means is disengaged from the first outer gear means. Also included in the wedge actuating means are first locking means for moving the first end of the first arm in a manner to cause the first wedge means to engage the first outer gear means, and second locking means for moving the second end of the first arm in a manner to cause the second wedge means to engage the second outer gear means. Also included are drive gear means which are operatively connected to the first and second locking means in a manner that (i) movement of the drive gear means in a first direction causes the first locking means to move the first wedge means to engage the first outer gear means, and (ii) movement of the drive gear means in a second direction causes the second locking means to move the second wedge means to engage the second outer gear means.

In a further embodiment, the apparatus also includes means (i) for generating a driving force to the first axle means when the first axle means is not rotating and the second axle means is rotating due to a difference in traction between a subsurface and first and second track means of the vehicle which are engaged to the first and second axle means, respectively, and (ii) for generating a driving force to the second axle means when the second axle means is not rotating and the first axle means is rotating due to a difference in traction between the subsurface and a first and second track means. The aforementioned drive force generating means includes first wedge means for engaging the first outer gear means in a manner to reduce the rotational velocity of the first outer gear means, and a second wedge means for engaging the second outer gear means in a manner to reduce the rotational velocity of the second outer gear means. Means are included for causing the first and second wedge means to engage the first and second outer gear means, respectively, in a manner to cause a reduction in the rotational velocity of the first and second outer gear means. The reduction in rotational velocity of the first outer gear means when the first axle means is rotating and the second axle means is nonrotating reduces the rotational velocity of the first axle means and imparts a rotation to the second axle means by the differential gear means. The reduction in the rotational velocity of the second outer gear means when the second axle means is rotating and the first axle means is nonrotating reduces the rotational velocity of the second axle means and imparts a rotation to the first axle means by the differential gear means.

In the present invention there is also a method for receiving a drive input and for generating a drive output in response to the drive input in a manner to propel a vehicle having a lengthwise axis and a transverse axis in a selected direction. The method includes the steps of rotating a cage in response to the drive input about a first axis which has a substantial alignment component which is parallel to the transverse axis. There is also included the step of rotating the cage about the first axis at a first rotational velocity to cause a differential gear to rotate about the first axis so as to cause rotation of a first and second axle about the first axis to generate the drive input for propelling the vehicle. In addition, first and second intermediate gears are engaged to the first and second axles, respectively, in a manner that (i) axial rotation of the first intermediate gear about a second axis which is parallel to the transverse axis causes an increase in the rotational velocity of the first axle relative to the second axle to cause the vehicle to turn in a first direction, and (ii) an axial rotation of the second intermediate gear about the second axis causes an increase in the rotational velocity of the second axle relative to the first axle to cause the vehicle to turn in a second direction. Furthermore, the method includes the step of engaging the first and second intermediate gears to first and second outer gears, respectively, which rotate about the first axis for movement in (1) a first non-steering mode in which the first and second outer gears rotate about the first axis at a first rotational velocity and the first and second intermediate gears are characterized by their nonrotation about the second axis, and (2) a second steering mode in which (i) the first outer gear rotates at a velocity which is less than the first rotational velocity to cause the first intermediate gear to rotate about the second axis and to cause the increase in the rotational velocity of the first axle thereby causing the vehicle to turn in the first direction, and (ii) the second gear to rotate at a velocity which is less than the first rotational velocity to cause the second intermediate gear to rotate about the second axis and to cause the increase in the rotational velocity of the second axle and thereby cause the vehicle to turn in the second direction. In addition, there is provided the step of reducing the rotational velocity of the first outer gear means below the first rotational velocity to turn the vehicle in the first direction, and to reduce the rotational velocity of the second outer gear below the first rotational velocity to turn the vehicle in the second direction.

It is therefore an object of the present invention to provide a steerable differential and steering assembly for turning a vehicle in a selected direction.

BRIEF DESCRIPTION OF THE DRAWINGS

These and other objects and advantages of the present invention will become more readily apparent upon reading the following Detailed Description and upon reference to attached Drawings in which:

FIG. 9 is an end sectional view of the steering brake taken along line 9—9 of FIG. 6;

FIG. 10 is a partial sectional view of the braking handle taken along line 10—10 of FIG. 7;

FIG. 11 is a partial sectional view of the steering brake looking upward along an arc 11—11 of FIG. 6; and FIG. 12 is a partial sectional view of the steering brake looking upward along a line 12—12 of FIG. 7.

FIG. 22 is a sectional view taken along lines 22—22 of FIG. 16 and showing a quick turn actuating arm and antispin actuating arm.

Figure 1:
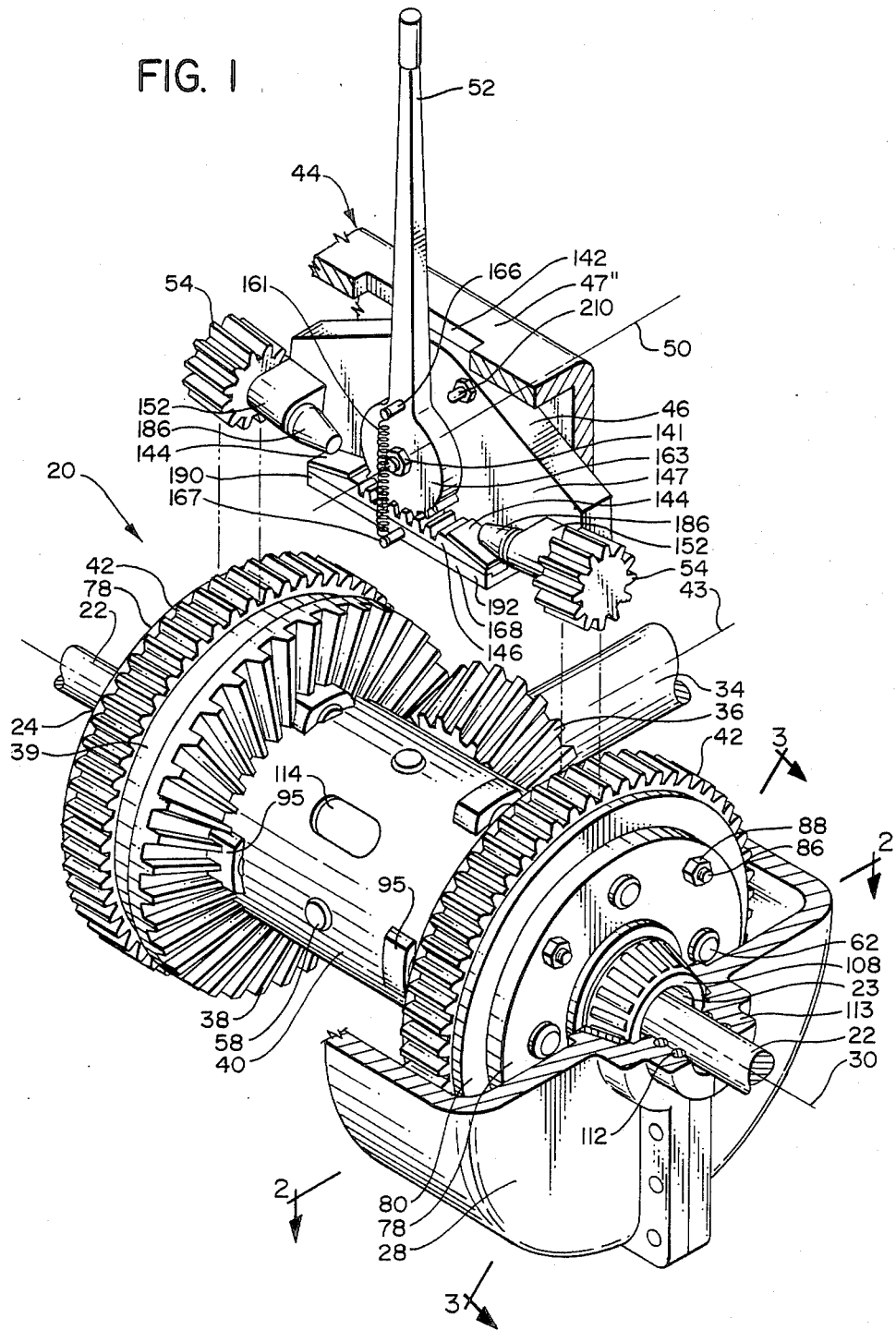
FIG. 1 is an isometric view of the steerable differential and steering brake of the present invention, and showing the steering brake elevated above its normal position relative to the steerable differential for ease of illustration.

While the present invention is susceptible to various modification and alternative forms, specific embodiments thereof have been shown by way of example in the Drawings and will herein be described in detail. It should be understood, however, that it is not intended to it the invention to the particular forms disclosed, but on the contrary the intention is to cover all modifications, equivalents and alternatives falling within the spirit and scope of the invention as expressed in the appended claims.

DETAILED DESCRIPTION OF THE INVENTION

The present invention pertains to a differential gear assembly for a vehicle which is steerable by means of a steering brake assembly to cause the vehicle to turn in a selected direction. In an exemplary embodiment, the differential gear and brake assemblies of the present invention are utilized to achieve the desired turning of a tracked vehicle.

Figure 4:
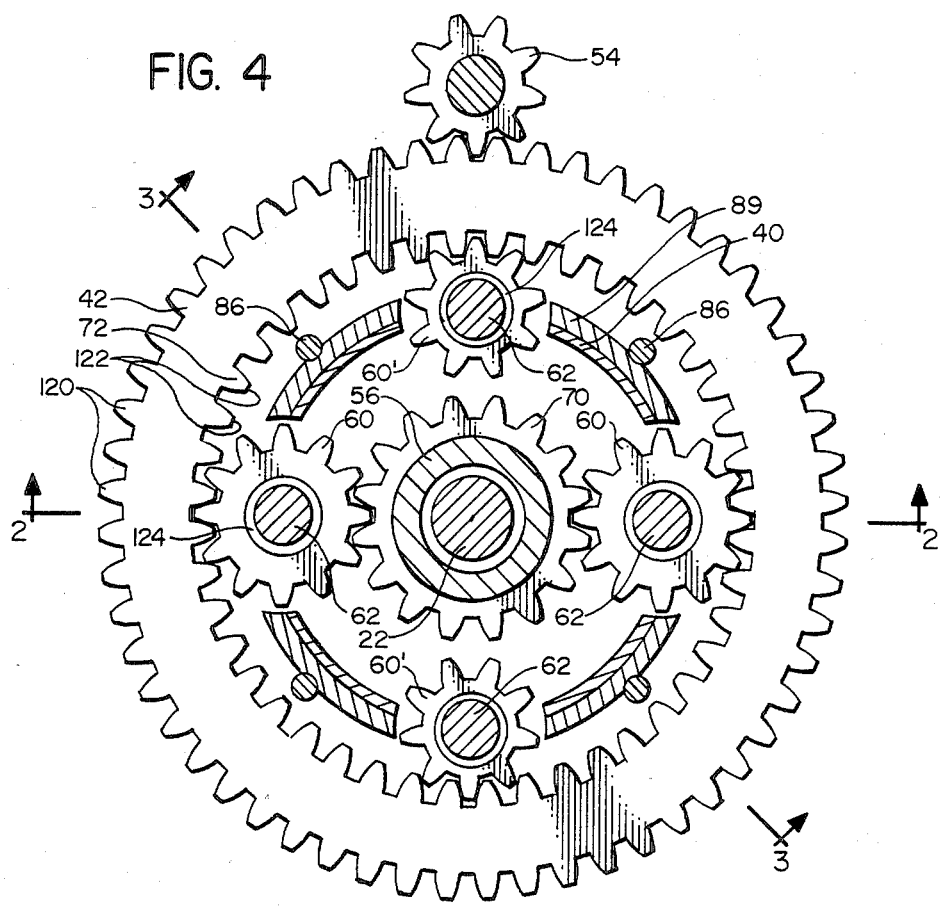
FIG. 4 is an end sectional view of the steerable differential taken along line 4—4 of FIG. 2.
Figure 7:
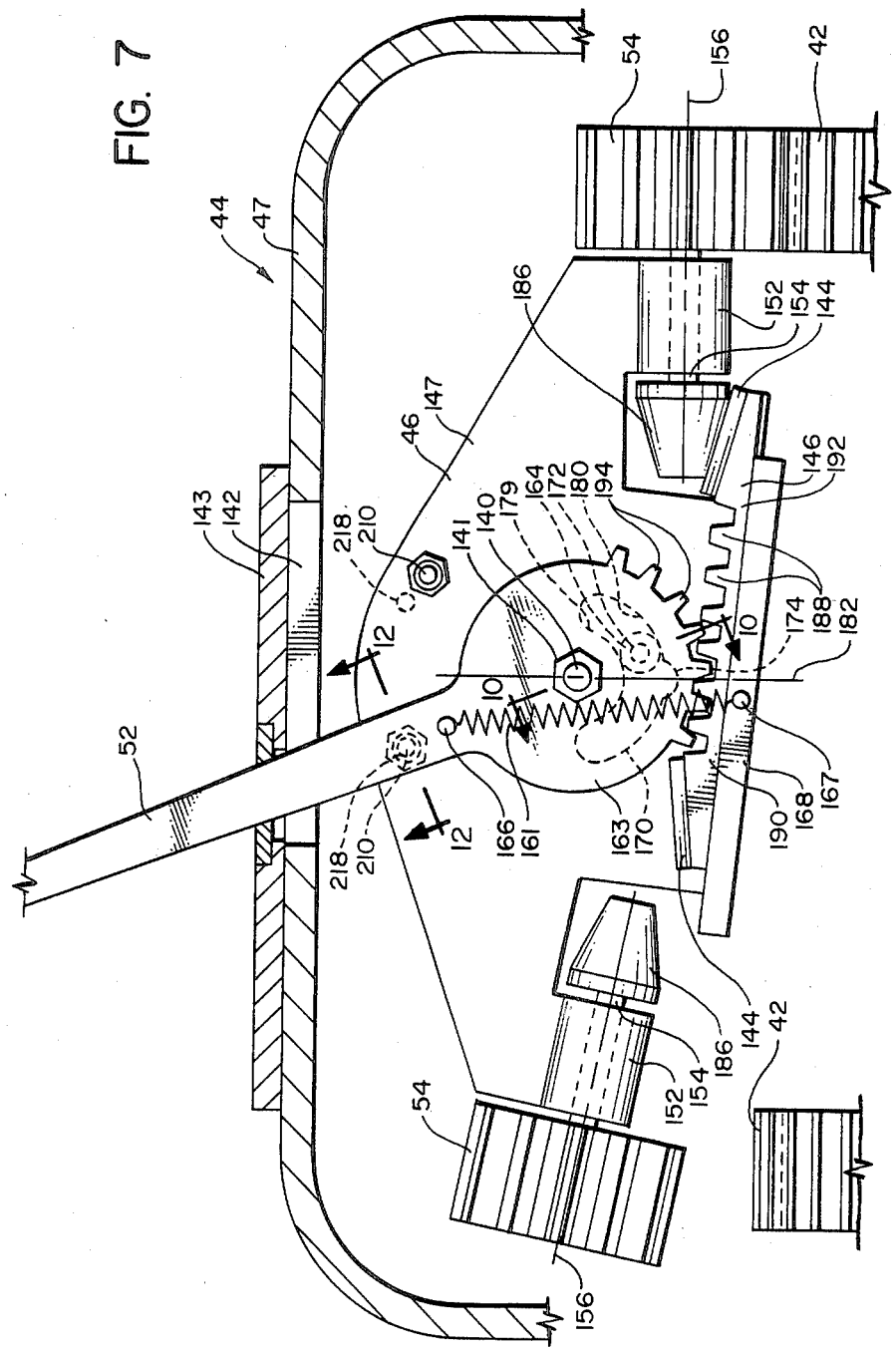
FIG. 7 is a rear view of the steering brake showing the brake engaged to the right end of the steerable differential to institute a left turn.

Referring to FIGS. 1, 4 and 7, the principal elements of the present invention will be described, followed by a more detailed discussion of the principal elements as well as the remaining elements of the invention. There is shown in FIG. 1, a steerable differential generally indicated at 20, and having an axle shaft 22 extending through an opening 23 at the left end 24 of the steerable differential, and an opposing axle shaft 22 extending through another opening 23 at the right end 28 of the differential. Left, right shafts 22 are co-axially aligned for rotation about a common transverse rotational axis designated by a line 30. Connected to the respective ends of shafts 22 are gear wheels (not shown) which are engaged to tracks or wheels (also not shown) to propel a vehicle which contains the apparatus of the present invention.

A drive input to the steerable differential 20 is provided by a main drive shaft 34 having a rigidly fastened bevelled pinion gear 36 which engages a ring gear 38. Ring gear 38 is rigidly connected to an adjacent annular left ring flange 39 which in turn is rigidly mounted to the outer surface of a cylindrical cage 40 of the steerable differential 20. Another annular ring flange 39 is rigidly connected to the right portion of cage 40 about the outer surface of cage 40. Briefly, rotation of ring gear 38 and cage 40 therewith due to a drive input from pinion gear 36 causes a corresponding rotation of drive shafts 22 about rotational axis 30 to cause the vehicle to proceed in a selected direction. For purposes of explanation the longitudinal direction is designated by a line 43 (FIG. 1) which extends co-axially with main drive shaft 34; and the transverse direction is designated by the line 30 which also designates the rotational axes of axles 22.

Figure 6:
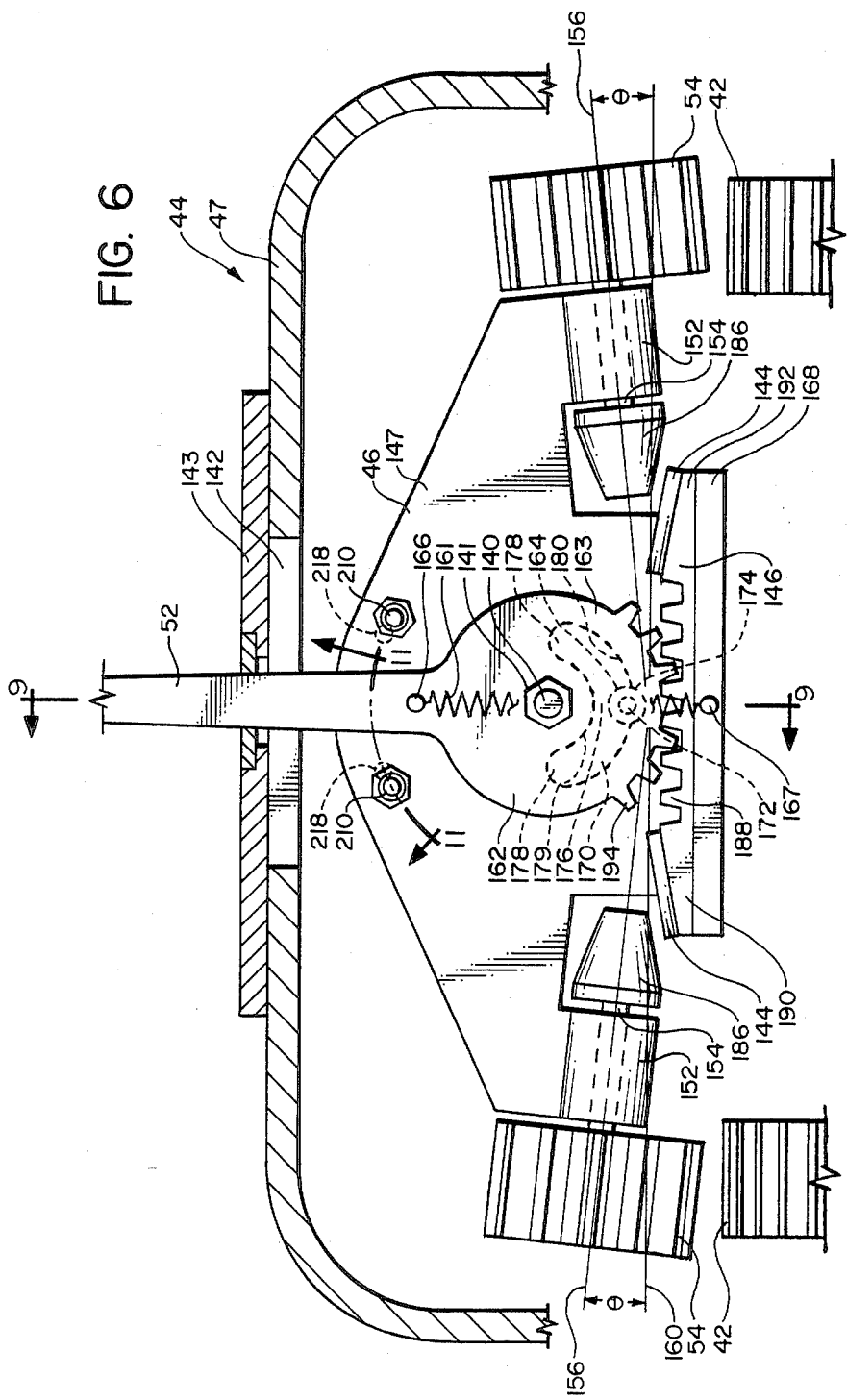
FIG. 6 is a rear view of the steering brake in a neutral position where neither end of the steerable differential is engaged.
Figure 8:
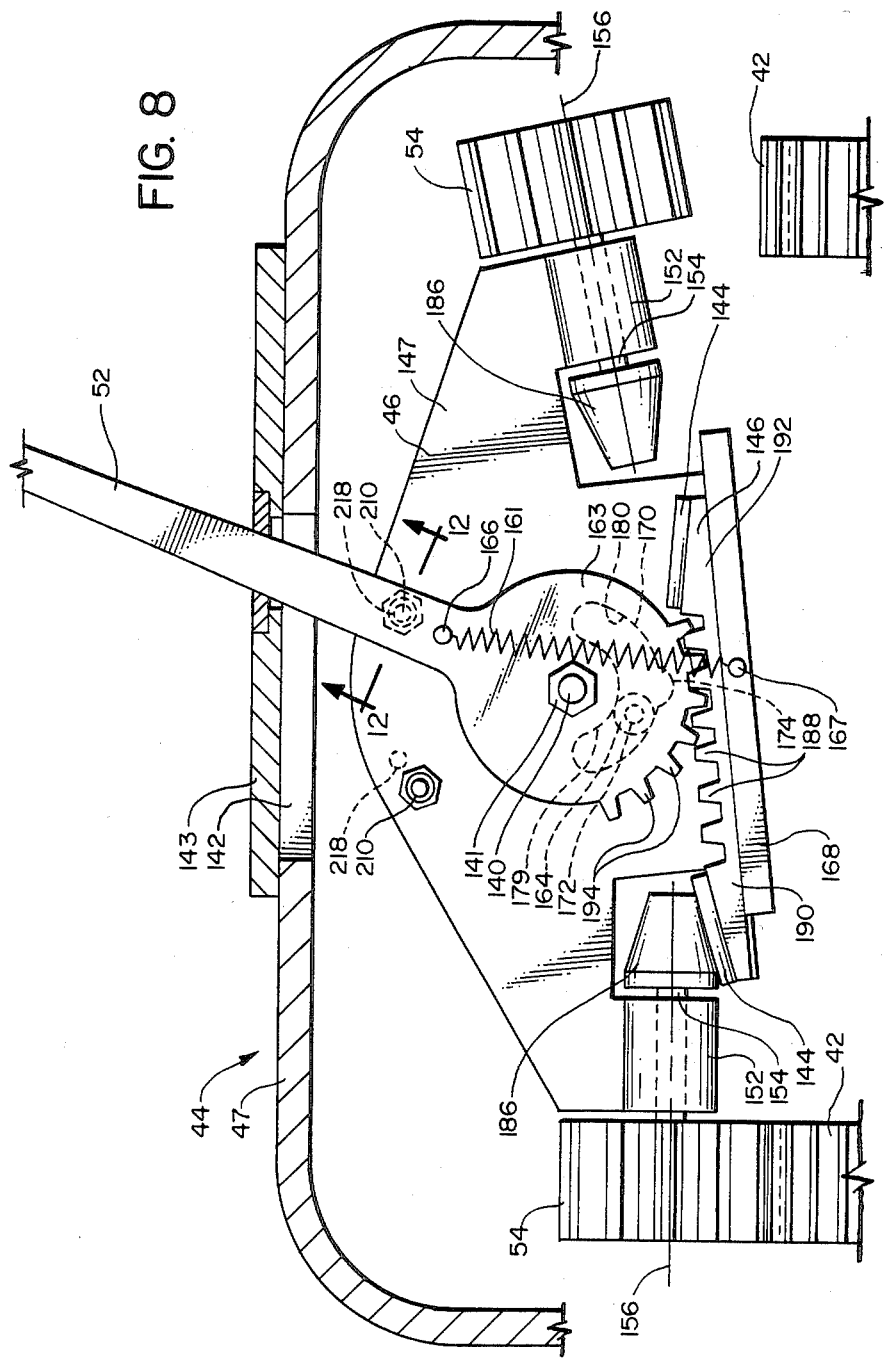
FIG. 8 is a rear view of the steering brake showing the steering brake engaged to the left end of the steerable differential to institute a right turn.

A turning maneuver is initiated by a steering brake, generally indicated at 44, which is shown in FIG. 1 to be elevated above its normal operating position for ease of illustration, and, which is shown in FIG. 6 in its normal operating position. Steering brake 44 includes a vertical flanged portion 46 which is pivotally mounted to an outer housing 47 for movement about a pivot axis designated by a line 50 (FIG. 1). Pivotally connected to braking flange 46 is a handle 52 which when moved manually by an operator in the left direction, for example, causes a right pinion gear 54 which is connected to the right end of flange 46 to engage right spur gear 42 of differential 20 in a manner shown in FIG. 7. This causes the rotational velocity of right spur gear 42 to decrease which in turn causes a corresponding increase in the rotational velocity of right axle 22 and a decrease in the rotational velocity of left axle 22, thereby causing the vehicle to enter a left turn. Likewise, movement of handle 52 to the right causes a left pinion gear 54 (FIG. 1), mounted to the left end of braking flange 46, to engage left spur gear 42 of differential 20 as shown in FIG. 8, causing the vehicle to enter a right turn.

Figure 2:
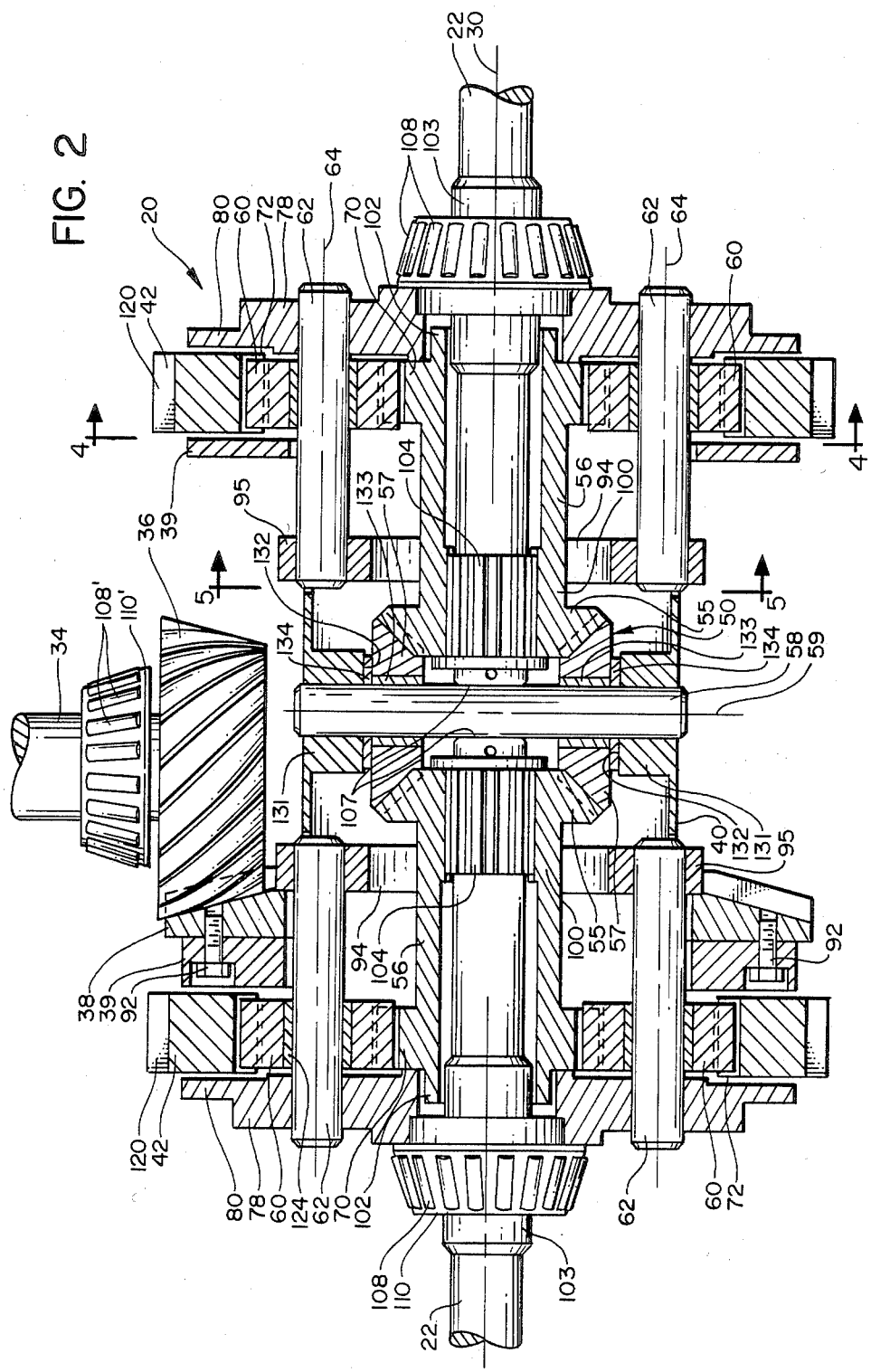
FIG. 2 is a top sectional view of the steerable differential taken along line 2—2 of FIG. 1.

The manner by which a reduction in velocity of the engaged spur gears 42 produces an increase in the rotational velocity of the drive axle 22 located on the same side of the cage 40 as the engaged spur gear 42, may be understood by referring to FIG. 2. In FIG. 2 there is shown a conventional differential unit indicated at 50 mounted inside of cage 40, and which includes (i) left, right vertically mounted opposing bevelled transmission gears 55 which are integrally connected to left, right axially extending hub sleeves 56 which in turn are mounted about and splined to left, right axles 22 for rotation therewith, and (ii) a pair of opposing bevelled spider gears 57 which engage transmission gears 55 and which are rotatably mounted to a spider shaft 58 which has a longitudinal axis designated by a line 59 which is generally perpendicular to rotational axis 30. Spider shaft 58 in turn is rigidly connected to the cage 40 in a manner that rotation of cage 40 about rotational axis 30 causes shaft 58 to rotate with cage 40 in a vertical plane through longitudinal axis 59. Thus, a drive input from main pinion 36 (FIG. 1) via ring gear 38 to rotate cage 40 about axis 30, causes spider gears 57 to travel in an annular path about axis 30 which in turn causes transmission gears 55 to rotate about their axes 30. Rotation of transmission gears 55 and axle sleeves 56 therewith causes a corresponding axial rotation of axles 22 to drive the vehicle in a linear path.

In the present invention, as shown in FIG. 2, additional elements of the steerable differential 20 include eight roller gears 60, four of which are mounted at the left end of cage 40 (only two shown) and four of which are mounted at the and right end of the differential 20 (only two shown). Four of these roller gears 60 are rotatably mounted to their respective shafts 62 which in turn are mounted to the left side of cage 40 at equidistant locations about its circumference. The remaining four roller gears 60 are rotatably mounted to the right side of cage 40 at equidistant locations about its circumference in a manner that each left shaft 62 is axially aligned with a right shaft 62 along a line 64 which is parallel to rotational axis 30. Left, right roller gears 60, which are planetary gears, are rotatably engaged to the inside of left, right spur gears 42 by means of internal spur teeth 72 of spur gear 42. In addition, left, right roller gears 60 are rotatably engaged to left, right sun gears 70 which are integrally connected to the left, right axle sleeves 56 at their outer ends from vertical transmission gears 55 for rotation with axle sleeves 56 about rotational axis 30.

As shown more clearly in FIG. 4, during rotation of cage 40 when there is no applied braking from steering brake 44, spur gear 42 and cage 40 as well as transmission gears 55, axle sleeves 56 and sun gears 70 therewith are caused to rotate about rotational axis 30 at substantially equal velocities to drive the vehicle in a linear direction via axles 22. Since there is no velocity difference between cage 40 and spur gears 42, roller gears 60 do not rotate about their respective axes. If for example, however, the rotational velocity of left spur gear 42 is caused to decrease by its engagement with pinion 54 of steering brake 44, the rotational velocity of left spur gear 42 is slowed relative to the rotational velocity of cage 40. This causes the left roller gears 60 to rotate in a direction opposite to the rotation of cage 40, about their respective axes at a rate equal to the difference between the rotational velocity of cage 40, and the reduced rotational velocity of left spur gear 42. This rotation of left roller gears 60 causes left axle sleeve 56 to rotate in a direction opposite to left roller gears 60, and in a manner which is additive to the rotational velocity of left axle sleeve 56 so that left axle sleeve 56 rotates at a greater velocity than cage 40. The result is an increase in the rotational velocity of left axle sleeve 56, which is engaged to left roller gears 60 via left sun gears 70, by an amount equal to difference in velocity between cage 40 and spur gear 42. This in turn increases the rotational velocity of left axle 22 by a corresponding amount. The increase in rotational velocity of left axle 22 causes a corresponding reduction in the rotational velocity of right axle 22 by means of differential unit 50 so that the vehicle turns to the right in correspondence with the position of handle 52. It should be appreciated that by increasing the braking force applied to spur gear 42, the rotational velocities of the corresponding roller gears 60 are caused to further increase, which in turn increases the rotational velocity of the corresponding axle 22 and thereby producing a sharper turn.

Figure 3:
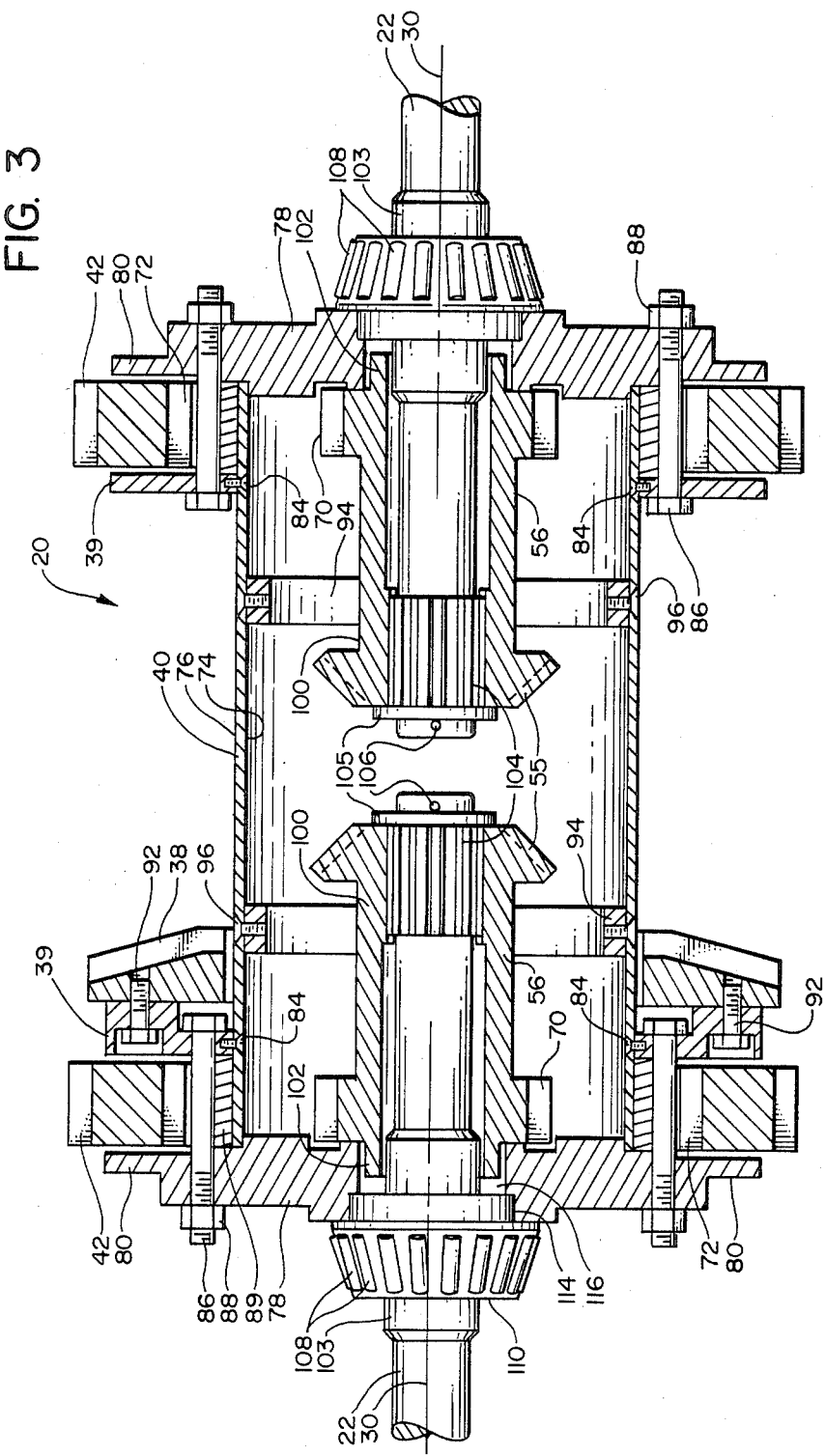
FIG. 3 is an end sectional view of the steerable differential taken along line 3—3 of FIG. 1 where the roller gears and spider gears of the differential unit have been omitted for clarity.

Having described the principal elements of the present invention and their operation, these elements and the remaining elements of the present invention will be described by first referring to FIG. 3 where roller gears 60, the differential spider gears 57 and spider shaft 58 have been removed for ease of illustration. There is shown in FIG. 3, the cage 40 which has a cylindrical configuration formed by an inner surface wall 74 and an outer surface wall 76. Cage 40 is enclosed at its left and right ends by left, right circular end plates 78 which have flanged portions 80 which extend radially beyond outer surface 76 of cage 40. In order to secure left, right end plates 78 to cage 40, left, right annular ring flanges 39 are rigidly connected to the outer surface of cage 40 by means of screw fasteners 84. The left, right outer radial portions 80 are secured to left, right ring flanges 39 by means of a number of axially extending bolts 86 and nuts 88.

To prevent axial movement of spur gears 42 on cage 40, each spur gear 42 is mounted between the corresponding outer radial portion 80 and ring flange 39. In addition, there are left, right annular ring flanges 89, which have larger axial thickness dimensions than do spur gears 42, and which are mounted on cage 40 radially inward of left, right spur gears 42 and between each radial portion 80 of end plate 78 and each ring flange 39. This prevents radial portion 80 and ring flange 39 from binding upon spur gear 42 during tightening of nuts 88 so that the spur gear 42 is free to rotate relative to cage 40.

As discussed previously, cage 40 is rotated by means of an input pinion gear 36 (FIG. 1) about rotational axis 30. Input pinion gear 36 is driven by a conventional vehicle engine and transmission assembly (not shown) in order to drive axles 22 via steerable differential 20. In order to receive a drive input from pinion 36, ring gear 38 includes a number of teeth which are mounted axially inward from left spur gear 42, i.e. in an axial direction along rotational axis 30 toward the center of cage 40, and which engage the helically shaped teeth of main pinion 36 to cause rotation of cage 40 and spur gears 42 about axis 30. Ring gear 38 is mounted on the outer surface of cage 40 axially inward of and adjacent to left ring flange 39 by means of axially extending fastener screws 92.

Figure 5:
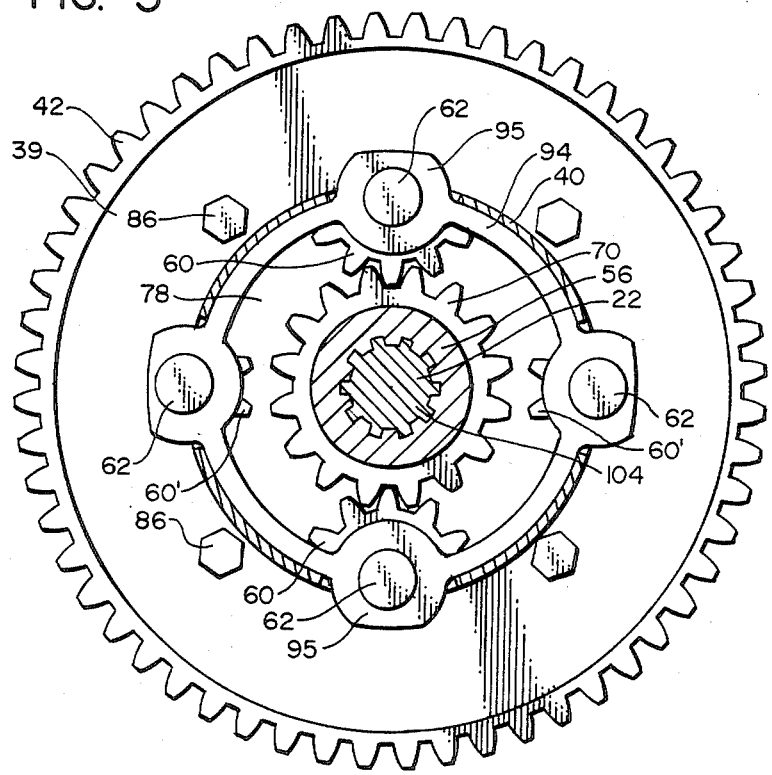
FIG. 5 is an end sectional view of the steerable differential taken along line 5—5 of FIG. 2.

Referring to FIG. 3, in order to support left, right roller gears 60 for rotation about axes 64, left, right annular support rings 94 are mounted to the inside surface of cage 40 by means of screw fasteners 96. As shown more clearly in FIG. 5, each support ring 94 includes four circular flanged portions 95 located at equidistant locations about ring 94 and which are rigidly connected to roller shafts 62 to support roller gears 60 inside cage 40.

Referring again to FIG. 2, axle sleeves 56 extend inside support rings 94 where they are connected to transmission gears 55 at their respective inward ends 100. Axles sleeves 56 are supported for rotation at their respective outward ends 102 by left, right integral shoulder portions lu3 which extend radially outward from left, right axles 22. Axial rotation of transmission gears 55 causes corresponding axial rotation of axles 22 by means of left, right splined end portions 104 (FIG. 3) of left, right axles 22 which engage complementary splined inner surfaces of left, right axles sleeves 56 at their respective axially inboard ends. Each axle 22 is retained within its corresponding axle sleeve 56 by means of a washer 105 and cotter pin 106 which is engaged to the axially inboard end of each axle 22. To properly secure axles 22 within cage 40, the inboard ends 107 of axles 22 abut against the outer surface of spider shaft 58 as shown more clearly in FIG. 2.

As shown in FIG. 1, the differential steering gear 20 and steering brake 44 are enclosed inside outer housing 47 which includes left and right sections 47', 47'' which are bolted together; however, only part of the left and right housing sections are shown for ease of illustration. Support for rotation of steering differential 20 about axis 30 is provided by roller bearings 108 (FIG. 3) which are mounted in left, right collars 110 which in turn are mounted to the left, right end plates 78. Likewise, left, right axles 22 are supported by bearings 112 (FIG. 1) which are mounted in collars 113 which in turn are connected to the left, right ends of housing 47.

Shoulder portions 103 of axles 22 are supported in a conventional manner within collars 113 (FIG. 2) by bearings (not shown). Furthermore, main drive shaft 34 is supported in housing 47 by roller bearings 108' which are mounted in collar 110'. To facilitate removal of cage 40 from housing 47, an opening 114 (FIG. 1) is provided in cage 40 to permit removal of the cotter pins from the inboard ends of axles 22. This allows removal of axles 22 from cage 40 and subsequent removal of cage 40 from housing 47.

To permit each spur gear 42 to rotate about axis 30 outside of cage 40, and at a different rotational velocity than that of cage 40, reference is made to FIGS. 2 and 4 where spur gear 42 is shown to have an annular configuration including a number of spur teeth 120 about its outer circumference, and internal spur teeth 122 about its inner circumference. As shown in FIG. 4, left, right spur gears 42 are supported by left, right roller gears 60 which extend upward through respective openings in the wall of cage 40 to engage internal spur teeth 122. There are two larger roller gears 60 which simultaneously engage spur gear 42 and sun gear 70, and two smaller roller gears 60' which engage only spur gear 42. Roller gears 60 (FIG. 2) are supported by cage 40 for rotation about their respective axes on by means of the axially extending shafts 62. As mentioned previously, (i) shafts 62 are rigidly engaged to end plates 78 at their axially outboard ends, and to support flanges 94 at their axially inboard ends, and (ii) left, right roller gears 60 are rotatably engaged to left, right axle sleeves 56 by means of left, right sun gears 70 which are connected to the left, right axle sleeves 56. During rotation of cage 40 about axis 30, roller gears 60 rotate with cage 40 in an annular path around axis 30. However, unless there is a difference in rotational velocity between the cage 40 and spur gear 42, roller gears 60 do not rotate about their axes 64.

In order to permit a difference in rotational velocities of left, right axles 22 in a turn, differential unit 50 operates in a conventional manner. For example, if the velocity of the left transmission gear 55 (FIG. 2) and left axle 22 therewith is caused to increase such as when a right turn is initiated, this increase in velocity of the left transmission gear 55 relative to the right transmission gear 55 causes spider gears 57 to rotate about their axes 59, which in turn causes a reduction in the velocity of the right transmission gear by a corresponding amount. This reduction in velocity is transmitted via the right axles sleeve 56 to the right axle 22, thereby reducing the rotational velocity of the right axle. However absent any velocity differential between the left and right transmission gears 57, they do not rotate about axis 59.

Operationally, a drive input from main pinion 36 (FIG. 1) is transmitted to ring gear 38 which is rigidly fastened by means of ring flange 39 to cage 40. Rotation of cage 40 causes differential unit 50 (FIG. 2) to rotate about its axis 30 by means of spider shaft 58 which is fixedly mounted to cage 40. Spider shaft 58 is held rigidly at its opposite ends by collars 131 which are mounted to the inner surface of cage 40. Spider gears 57 are rotatably mounted on spider shaft 58 by bearings 133. To secure spider gears 57 on shaft 58, bearings 134 are mounted on shaft 58 between the inner end faces 132 of collars 131 and the opposing surfaces of spider gears 57. Spider gears 57 include bevelled edges which engage complementary bevelled edges of transmission gears 55 to form differential unit 50. As cage 40 is rotated about axis 30 and during a non-turning mode of operation, spider gears 57 travel in an annular path about axis 30 but do not rotate about rotational axis 59. This causes left, right transmission gears 55 and left, right splines 104 to rotate at substantially equal velocities therewith, which in turn causes axial rotation of axles 22 at substantially equal velocities. During a turning mode of operation, however, the left, right transmission gears 55 rotate in opposite directions so that the axle 22 on the outside of the turn rotates at a greater velocity than the axle 22 on the inside of the turn.

As shown in FIG. 4, the aforementioned rotation of cage 40 causes movement of roller gears 60 with cage 40 along an annular path about axis 30. When steering brake pinion 54 is not engaged with spur gear 42 during the aforementioned movement of roller gears 60 with cage 40, roller gears 60 are held rigid about their rotational axes 64 by sun gears 70 which rotate about axis 30 at the same velocity as does cage 40. On the other hand, when pinion 54 engages outer teeth 120 of spur gear 42, as shown in FIG. 4 in braking engagement, the rotational velocity of the engaged spur gear 42 is reduced relative to the rotational velocity of cage 40, which continues to rotate with little or no decrease in its velocity. This rotational velocity differential, $\Delta x$, between the engaged spur gear 42 and cage 40 causes the associated roller gears 60 to rotate about their respective axes by a rotational velocity equal to $\Delta x$. This rotational velocity $\Delta x$ of the roller gears 60 causes the rotational velocity of the associated sun gear 70 to increase from its previous velocity of x, to a greater velocity equal to $x + \Delta x$.

Returning again to FIG. 2, the resulting increase in rotational velocity of the sun gear 70 and associated axle sleeve 56 therewith causes an increase $\Delta x$ in the rotational velocity of the corresponding axle 22. This increase in rotational velocity $\Delta x$ of axle sleeve 56 is transmitted via differential unit 50 in a conventional manner discussed previously to cause a corresponding decrease in the velocity of the opposite axle sleeve 56 and its associated axle 22, thus causing the vehicle to turn toward the side having the decreased axle velocity, and away from the side having the increased axle velocity.

It should be appreciated in the present invention that application of only a slight frictional force to spur gear 42 from braking assembly 44 will produce a turn in the desired direction. This is because any reduction in the rotational velocity of spur gear 42 immediately causes a rotation of the associated roller gears 60 and an increase in rotational velocity of the associated axle. Therefore, rather than generating a braking force to initially slow one of the axles to initiate a turn as in conventional apparatus, the present invention increases the velocity of the axle to initiate the turn, with the differential gear 50 functioning in a conventional manner to permit a difference in axle speeds to perform the turn. Since spur gears 42 are rotatably supported on roller gears 60 (FIG. 4), the braking force need only be sufficient to slow the rotation of the spur gear 42 as it rides upon the roller gears 60 in order to produce a turn. Thus, only minor loads are placed on the vehicle engine and transmission.

Having described the elements and operation of the steerable differential 20, a description of the elements and operation of steering brake 44 is provided by referring to FIG. 1. As discussed previously, steering brake 44 is pivotally connected to housing 47 for pivotal movement about axis 50, by a threaded bolt 140 which extends lengthwise through braking flange 46 and steering handle 52, and which is secured by a nut 141. Bolt 140 is mounted to housing 47 so that pivot axis 50 is generally parallel to main drive shaft 34 and generally perpendicular to rotational axis 30. The shaft of handle 52 extends upwardly through an opening 142 in housing 47 which is sized to permit lateral movement of handle 52 during a braking maneuver. Opening 142 includes a cover 143 (FIG. 6) which is rigidly fastened to handle 52 and which slidably engages the outer surface of housing 47 above hole 142 during transverse movement of handle 52.

Handle 52 is pivotally connected to braking flange 46 which in turn is pivotally mounted to housing 47. To permit handle 52 to pivot independently of vertical flange 46, threaded bolt 140 is pivotally mounted within vertical flange 46 by means of bushing 145 (FIG. 9) which includes vertical end faces 148, one of which pivotably engages an axially extending portion at the rear of handle 52. Rotation of handle 52 about its pivot axis 50 in a transverse direction causes the end of flange 46 which is opposite to the direction of movement of handle 52 to tilt downward as shown in FIG. 7. This causes the braking pinion 54 on the downward end to be brought into engagement with spur gear 42 thereby causing pinion 54 to rotate about its axis. This rotation of pinion 54 is sloped or halted by means of left, right friction pads 144 which are connected to the opposite ends of a gear rack 146 and which are moved transversely into engagement with the braking pinion shaft by transverse movement of the gear rack 146 in response to movement of handle 52. It should be appreciated that the steering brake 44 generates a turn in the direction of movement of handle 52. For example, if a left turn is desired, the handle 52 is rotated to the left causing the right pinion 54 to engage the right spur gear 42. A decrease in the rotational velocity of the right spur gear 42 produces a left turn in a manner discussed previously.

Having described the principal components of steering brake 44 and their function, these principal elements and the remaining elements will be described in more detail. As shown in FIG. 1, in order to engage spur gear 42 of steering differential 20, left, right braking pinion gears 54 of steering brake 44 are rotatably mounted to left, right mounting brackets 152 which in turn are rigidly fastened to a front surface 147 of the braking flange 46. Left, right braking pinions 54 include left, right drive shafts 154 (FIG. 6) which are rotatably mounted within brackets 152 for rotation about their respective pivot axes, each of which is designated by a line 156 and which extend in a transverse direction. When steering brake 44 is in its neutral position, shown in FIG. 6, where handle 52 occupies a somewhat vertical position, each pivot axis 156 forms an acute angle $\theta$, with a horizontal plane, designated by a line 160, and which is parallel to the upper surfaces of spur gears 42.

The tilting of flange 46 through angle $\theta$ by rotation of handle 52 is achieved by the combination of (i) a compression spring 161 of a lower rounded portion 163 of handle 52, as shown in FIG. 1, and (ii) a roller wheel 164 (FIG. 6) which is rotatably mounted to the front surface 147 of braking flange 46 behind handle 52 and which is shown by hidden lines in FIG. 6. As shown in FIG. 1, compression spring 161 extends in a generally vertical direction in a manner parallel to the lengthwise axis of the shaft of handle 52 and is secured at its upper end to an upper pin 166 which extends outwardly from the lower portion 163 of handle 52 parallel to pivot axis 50. The lower end of spring 161 is secured to a lower pin 167 which extends outwardly from a channel 168 which is rigidly connected to the front surface 147 of flange 46 and which supports gear rack 146 for transverse slidable movement.

Referring to FIG. 6, tilting of flange 46 is achieved by roller 164 which is rotatably engaged within an upwardly curved slot 170 in the lower portion of flange 46. Roller 164 is rotatably mounted to a shaft 172 which in turn is rigidly connected to the rear surface of handle 52. Slot 170 has a lower detent portion 174 extending downwardly from a lower middle portion of the slot 176 between upwardly curved end portions 178 of slot 176. Roller 164 is spring biased in a downward direction so that when handle 52 is in the vertical neutral position, roller 164 is engaged within the detent 174 to retain handle 52 in the neutral position and to insure that steering brake 44 remains disengaged from steering differential 20.

However, movement of handle 52 to the left, for example, as shown in FIG. 7, urges roller 164 upwardly out of detent 174 along the right upwaroly curved portion of the slot 170 in a manner that roller 164 engages upper, lower curved surfaces 179, 180 which form slot 170. Proceeding upward from detent 174 the distance between handle pivot shaft 140 and slot surfaces 179, 180 increases. Thus, as roller 164 rides upwardly within slot 170, roller 164 travels along a curved path which defines a progressively increasing distance from pivot shaft 140. This applies a downward force to the right side of flange 46 thereby causing it to rotate about shaft 140 in a downward direction.

At the same time, spring 161 is secured to upper pin 166 in a manner so that movement of handle 52 to the left causes pin 166 to be offset from a vertical centerline designated by a line 182 which passes through pivot shaft 140. This causes the left side of braking flange 46 to be urged in an upward direction to aid in bringing right braking pinion 54 into engagement with right spur gear 42 as shown in FIG. 7. On the other hand, rotation of the handle 52 to the right, as shown in FIG. 8, causes the left end of braking flange to be tilted downward and left planar friction pad 144 to be brought into engagement with left conical member 186. This causes a reduction in rotational velocity of left spur gear 42 and the initiation of a turn in the right direction.

When braking pinion 54 is engaged with the selected spur gear 42, a reduction in the rotational velocity of the spur gear 42 is achieved by the engagement of the corresponding one of the left, right friction pads 144 of gear rack 146 with left, right conically shaped friction members 186; friction members 186 being rigidly connected to the inboard ends of left, right pinion shafts 54 for rotation about axis 156. Gear rack 146 includes a left end portion 190 and a right end portion 192 to which are engaged left, right planar friction pads 144, respectively, and which are inclined downwardly in the outward transverse direction so that when braking pinion 54 is engaged to spur gear 42, as shown in FIG. 7, the planar surface of friction pad 144 frictionally engages the respective conical surface of friction pad 186.

Frictional engagement of planar pad 144 and conical pad 186 is achieved by movement of the gear rack 146 within gear rack channel 168 in an outward transverse direction, and in a direction which is opposite to the direction of rotation of handle 52. In the present discussion of steering brake 44, the inboard direction is defined as a direction towards vertical axis 182 and the outward direction is defined as a direction away from vertical axis 182. This movement of gear rack 146 is achieved by engagement of rack teeth 188 which extend upwardly from the base of the gear rack between left, right friction pads 144, with teeth 194 of handle 52 which extend downwardly from the outer lower curved surface of lower handle portion 162. Therefore, rotation of steering handle 52 to the left, for example, as shown in FIG. 7, causes rightward outward transverse movement of gear rack 146 within channel 168 so that friction pad 144 is brought into engagement with conical member 186.

As mentioned previously, roller wheel 164 is biased in a downward direction so that when handle 52 is in the vertical neutral position, roller wheel 164 is biased into detent 174. As shown more clearly in FIG. 9, support for roller wheel 164 is provided by roller support shaft 172 which is connected to a slide block 192 at the left end of shaft 172 for movement in a generally vertical direction within handle lower portion 163 in a manner parallel to the shaft of handle 52. Slide block 192, which includes an upper surface 194, a lower surface 196, and upstanding sidewalls 198, is slidably engaged in a vertical slot 200 of lower handle portion 163 for vertical movement therein. A downward biasing force is exerted upon slide block upper surface 194 by an extension spring 202 which is contained within vertical slot 200. Spring 202 and slide block 192 are held in slot 200 by a lower set screw 204 which is engaged in a lower open end of slot 200 and which engages the lower surface 196 of slide block 192 when roller 164 is in the detent 174, as shown in FIG. 9.

When roller 164 is urged out of the detent 174, as shown in FIG. 10, by rotation of handle 52 away from the neutral position, slice block 192 rides upward in vertical slot 200 thereby compressing spring 202. To permit this vertical movement, roller shaft 172 occupies a channel 206 in handle lower portion 163 which has a vertical dimension sized to permit vertical travel of the roller shaft 172.

Referring again to FIG. 7, increased upward pressure of planar friction pad 144 against conical friction member 186, in order to further reduce the rotational velocity of spur gear 42, is generated by further movement of handle 52 away from the neutral position. It should be appreciated, however, that unless braking flange 46 is rigidly engaged to housing 47 during movement of handle 52 away from the neutral position, only a relatively small braking force can be applied to conical friction member 186. However, to anchor braking flange 46 to housing 47 so that increased rotation of handle 52 away from neutral position exerts greater pressure on conical friction member 186, braking flange 46 includes slide pins 210 for rigidly connecting braking flange 46 to housing 47 (i) after handle 52 has rotated through an arc of approximately 20° from the neutral position, and (ii) when planar friction pad 144 has engaged conical friction member 186. As shown in FIG. 1, slide pins 210, which are located near the top edge of the front surface 147 of braking flange 46, are slidably engaged within flange 46 for movement along a slide axis which is generally parallel to pivot axis 50.

As shown more clearly in the upward sectional views of the handle 52 and braking flange 46 in FIGS. 11 and 12, handle 52 includes a bevelled portion 212 at its rear surface 213 which engages tip 214 of slide pin 210 during movement of handle 52 away from the neutral position. As shown further in FIG. 12, slide pin 210 is located within flange 46 in a manner that when the rear surface 213 of the shaft of handle 52 engages slide pin 210, slide pin 210 is aligned with a hole 218 in a front surface 219 of housing 47 to receive slide pin 210 therein so that braking flange 46 is rigidly connected to housing 47. Therefore, further movement of handle 52 away from the neutral position with the braking flange 46 held rigid to housing 47, results in greater braking pressure being exerted by friction pad 144 on conical friction member 186.

Slidable movement of slide pin 210 occurs within a plug 220 (FIG. 12) which is threaded within an opening in the front surface 147 of braking flange 46. Plug 220 includes an axial channel 222 in which a cylindrical collar 224 of slide pin 210 is slidably engaged. Slide pin 210 is biased away from housing opening 218 by an extension spring 226 which is engaged between collar 224 and the closed end of plug channel 222. Collar 224 and extension spring 226 are retained in channel 222 by means of a cap 230 which is threaded to a portion of plug 220 which extends outwardly beyond the front surface 147 of braking flange 46.

In another embodiment of the present invention shown in FIGS. 13 through 22, the elements disclosed in the previous embodiment are designated by like numerals with an "a" suffix attached. It should be appreciated that there are times when it is desirable to initiate a rapid turn which is beyond the capability of the steering brake assembly 44 (FIG. 6). To accomplish this, there is provided in the present embodiment a quick turn and antispin assembly generally indicated at 300 in FIG. 16. As its name implies, assembly 300 not only performs the aforementioned quick turn maneuver, but in addition it can generate a driving force to both tracks of a vehicle in the event there is a sufficient difference in traction between the ground and the left and right tracks so that all of the drive power is delivered to the track having the reduced traction causing it to spin, while the track having the greater traction does not rotate.

Figure 13:
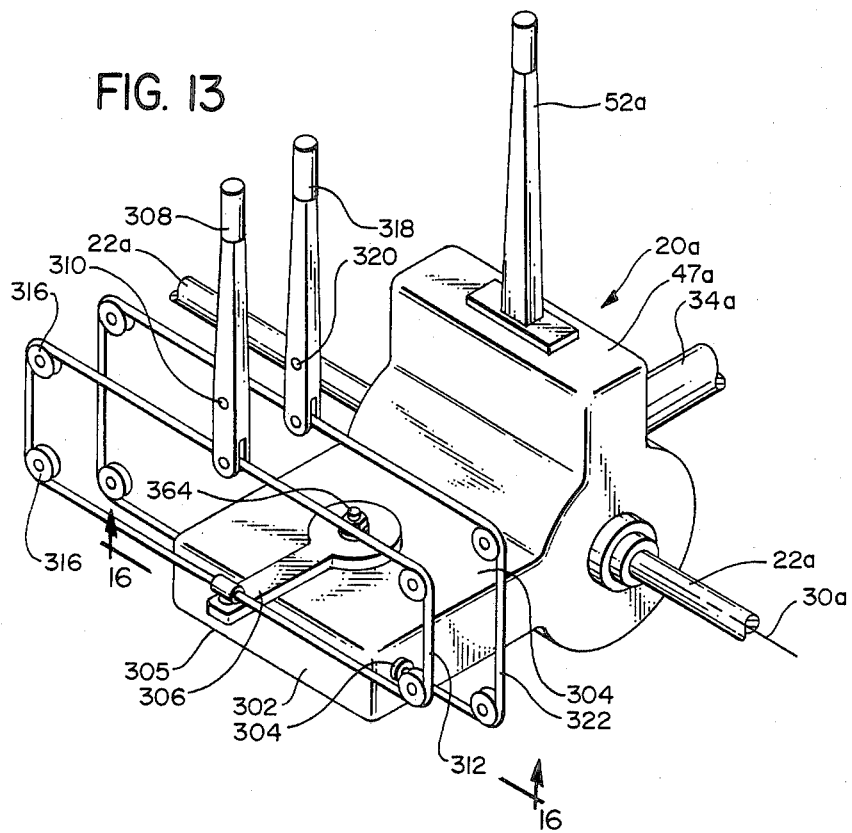
FIG. 13 is an isometric view of another embodiment of the present invention showing a housing incorporating the steerable differential and steering brake together with a quick turn and antispin assembly and associated quick turn and antispin actuating levers.

In order to enclose the quick turn and antispin assembly 300, there is shown in FIG. 13 steering differential housing 47a, as well as drive axles 22a, and steering brake 52a which extends in an upward generally vertical direction Housing 47a includes a rectangular box-like integral portion 302 which extends horizontally from a side of housing 47a opposite from the drive shaft 34a. Housing portion 302 includes a planar upper wall 304 having an upper surface to which an antispin arm 306 is pivotally connected for movement in a horizontal plane above upper wall 304, and a lower wall 305 (FIG. 22). Antispin arm 306 is rotated by a vertical antispin lever 308 which is pivotally connected to the vehicle (not shown) above antispin arm 306 by a pivot connector 310. Transverse rotation of antispin lever 308 causes pivotal horizontal movement of arm 306 by means of an endless cable 312 which is attached to the lower end of lever 308. The cable 312 is supported by idler pulleys 316 which are connected to the vehicle in a conventional manner.

The quick turn function of the assembly 300 is controlled by a vertical quick turn lever 318 which is pivotally connected to the vehicle by a pivot connector 320 for transverse movement. The lower portion of the quick turn lever 318 is connected to an endless cable 322 which extends in a transverse direction through opposite openings 324 in the vertical sides of housing portion 302. Inside housing portion 302, endless cable 322 is connected to a gear assembly indicated at 327 in FIG. 16. To permit their operation by one operator, antispin lever 308 and quick turn lever 318 are mounted in the vicinity of steering lever 52a.

Figure 14:
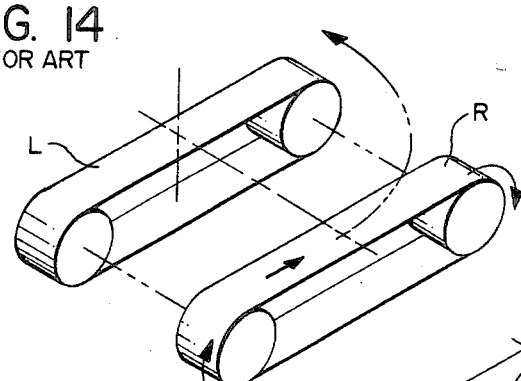
FIG. 14 is a diagram showing the conventional rotation of the left and right tracks of a tracked vehicle when performing a left turn.

Proceeding with a discussion of the quick turn function, reference is made to FIG. 14 which shows a turning maneuver performed in a conventional manner by a vehicle (not shown) having left and right tracks, L and R respectively. In a conventionally driven tracked vehicle, a turn is performed by braking or locking the track on the inside of the turn, e.g. track L in FIG. 14, and then rotating the opposite track on the outside of a turn in a forward direction, e.g. track R, to drive the vehicle in a left turn as shown in FIG. 14. A turn performed in the aforementioned conventional manner requires a large amount of power to drive the vehicle through the turn. Essentially the vehicle is skidded through the turn with the outside rotating track producing a sufficient driving force to not only propel the mass of the vehicle, but also to overcome the braking action of the locked inside track.

Figure 15:
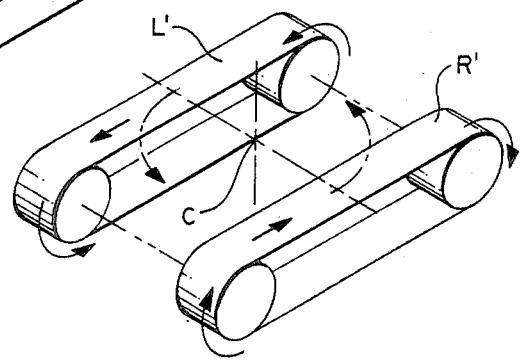
FIG. 15 is a diagram of the rotational directions of the left and right tracks when performing a left turn with the quick turn mechanism of the present invention.

In the present invention, a turning maneuver is performed by rotating the left and right treads in opposite directions as shown in FIG. 15. Thus, to perform a left turn, for example, while the right track R' is rotated in a forward direction, the left track L' is rotated in a rearward direction. This results in (i) a reduced power requirement since the inside track is aiding in the turn, and (ii) a tighter turn because a turning oint C' which is midway between the left and right tracks L', R', and midway between the front and rear of the tracks, remains essentially stationary during the turn. This is in contrast to the prior art apparatus of FIG. 14 in which the instantaneous center of the turn moves in a forward direction as well as in the direction of the turn. The quick turn of the present invention is accomplished as if the vehicle is turned about a single point, thus providing a very rapid and sharp turn with less power than is required conventionally.

The quick turning maneuver is performed by the quick turn and antispin assembly 300 which includes an inward end generally indicated at 328 (FIG. 16) which is positioned proximate to the spur gears 42a, and an outward end generally indicated at 329. The assembly 300 includes left and right vertical locking wedges 332, 332', respectively, which are pivotally connected to a transversely extending rocker arm 334 which selectively allows either the left or right locking wedge 332 to engage the corresponding outer ring gear 42a so that the rotation of the engaged spur gear 42a is stopped.

By referring to FIGS. 2 and 4, it may be seen that by stopping the rotation of a selected spur gear 42 the rotation of the axle 22 on the corresponding side of the steerable differential is caused to speed up in the forward clockwise direction (FIG. 1) and the axle 22 on the opposite side is caused to slow down and rotate in the opposite counterclockwise rearward direction. This is accomplished by the fact that the gear ratios (i) between the planetary roller gears 60 (FIG. 4) and the spur gears 42, and (ii) between the planetary roller gears 60 and the sun gear 70 are such that when one of the spur gears 42 is held stationary while the cage 40 continues to rotate, thereby causing the rotation of the corresponding roller gears 60, the resulting increase in velocity of the sun gear 70 and the axle 22 on the stationary spur gear side, is greater than the rotational velocity of the cage 40. Thus, the increase in velocity of the axle 22 on the stationary spur gear side is transmitted by the differential unit 50 to the opposite axle 22 to cause the opposite axle 22 to slow down and to rotate in the opposite direction. For example, if the gear ratio between the spur gear 42 and the roller gears 60 were 6 to 1, then when the spur gear 42 is held stationary while cage 40 continues to rotate to cause the differentiating action, the roller gears 60 revolve six times for every one revolution of cage 40. Furthermore, if the gear ratio between sun gear 70 and the roller gears 60 is 2 to 1, then every two revolutions of the roller gears 60 causes one revolution of the sun gear 70. Therefore, one revolution of cage 40, when the selected spur gear 42 is held stationary, causes an increase of three revolutions of the sun gear 70 and axle 22 on the stationary spur gear side. Thus for every forward revolution of cage 40, the axle 22 on the stationary spur gear side is rotated in a forward direction four revolutions.

Rotation of the opposite axle 22 in the opposite rearward direction is accomplished by means of the differential unit 50 in which the aforementioned increase in rotational velocity of the sun gear 70 of three revolutions for every one revolution of the cage 40 is transmitted via differential unit 50 to rotate the opposing sun gear 70 and axle 22 two rearward revolutions for every one forward revolution of cage 40. In other words, new axle velocity=cage velocity minus the change in rotational velocity of sun gear=one forward revolution of cage minus three rearward revolutions of sun gear per revolution of cage=two rearward revolutions of opposite axle per revolution of cage.

Referring again to FIG. 16 which is a bottom view looking upward along lines 16—16 of FIG. 13, the left or right spur gear 42a' is selectively engaged by the corresponding locking wedge 332 by means of inward movement of the left or right ends of the rocker arm 334 and the rotation of rocker arm 334 about a pivot axis 335 (FIG. 22) formed by a pivot pin 336 which extends vertically from a transmitting arm 337. For ease of explanation, the quick turn and antispin assembly 300 is divided in two portions by an imaginary centerline designated by the number 338, in FIG. 16, which lies in the horizontal plane perpendicular to axis 30a. Elements to the right of centerline 338 will be designated by the same numerals as those elements to the left of centerline 338 followed by a prime (') symbol. In the present invention, the aforementioned inward and outward movement of the locking wedges 332 is caused by the corresponding inward and outward movement of left, right locking racks 340, 340'. This movement of the locking racks 340 in turn is caused by rotation of the circular gear 327 via left and right idler gears 342, 342', respectively; the circular gear 327 being rotated by the transverse movement of the cable 322 in a manner described previously. It should be appreciated that in describing the present embodiment, the quick turn assembly 300 occupies a horizontal plane. For sake of clarity, the term "inward" refers to a direction toward spur gears 42a along a line which has a substantial alignment component which is parallel to centerline 338, while the term "outward" refers to a direction away from spur gears 42a.

Figure 17:
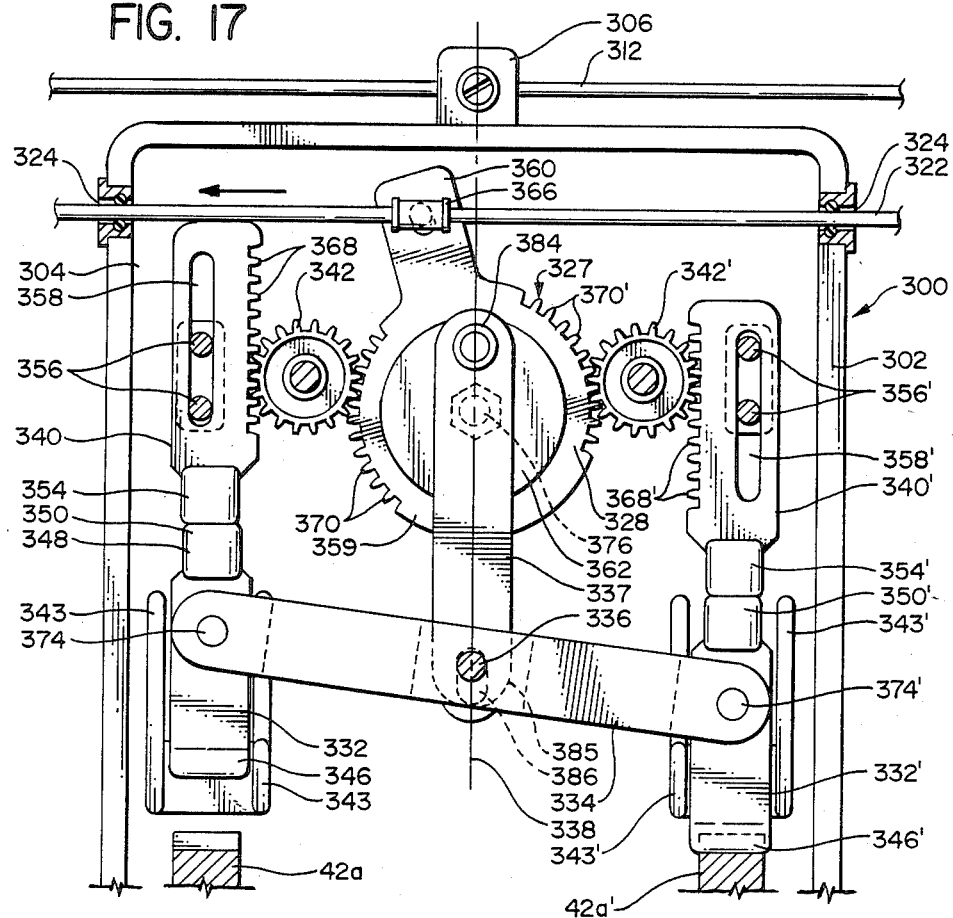
FIG. 17 is a view similar to that of FIG. 16 and showing the quick turn mechanism in an engaged position for performing a left turn.

In the present invention, a left or counterclockwise rotation of quick turn lever 318 (FIG. 13) causes a clockwise rotation of cable 322 and counterclockwise rotation of circular gear 327 therewith as shown in FIG. 17. Due to the counterclockwise rotation of circular gear 327, the right idler gear 342' rotates in a clockwise direction thereby moving the right locking rack 340' in an inward direction so that the right end of rocker arm 334a' is moved inward. This causes the right locking wedge 332a' to move inward to engage and be held against the right spur gear 42a'. Simultaneously, the left idler gear 342a is rotated in a clockwise direction causing the left locking rack 340 to move in an outward direction, thus permitting the upward movement of the left end of rocker arm 334 and the left locking wedge 332 therewith and the pivoting of rocker arm 334 about pivot axis 335.

In the present invention when the right locking wedge 332' engages and is held against the right spur gear 42a', the rotation of the right spur gear 42a' is caused to halt somewhat abruptly. In order to facilitate this stopping of the rotation of the right spur gear 42a', power to the steerable differential 20 via drive shaft 34 is interrupted by disengaging a clutch (not shown) which connects the vehicle engine to the drive shaft 34. The effect of terminating the rotation of the right spur gear 42a, is to cause the right axle 22a' to speed up in the forward direction and the left axle 22a to rotate in the opposite rearward direction as discussed previously so that a rapid left turn is initiated which corresponds to the position of the quick turn lever 318. In a somewhat similar manner, a quick right turn is initiated by moving the quick turn lever 318 to the right to cause the forward rotational velocity of the left axle 22a to be speeded up and the right axle 22a' to be rotated in the opposite rearward direction.

Figure 16:
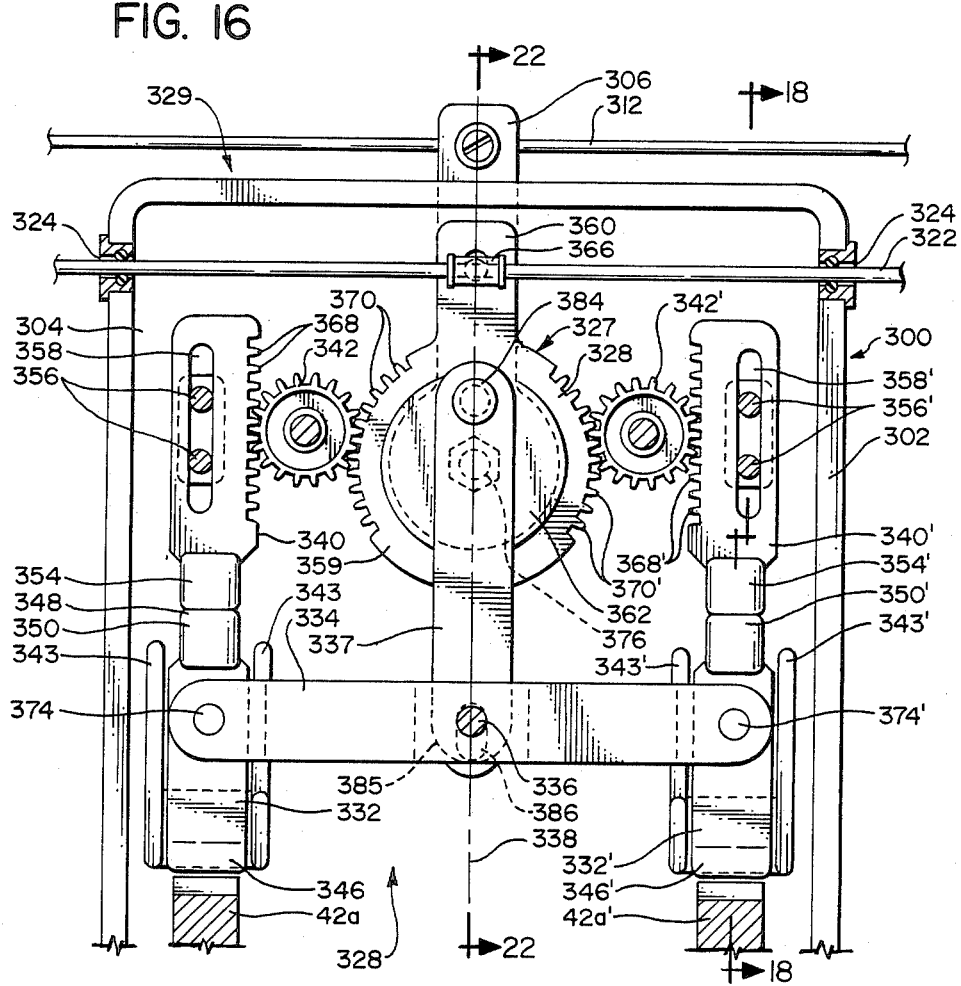
FIG. 16 is a sectional view taken along lines 16—16 of FIG. 13 looking upward and showing the quick turn and antispin assembly of the present invention in a disengaged position.
Figure 18:
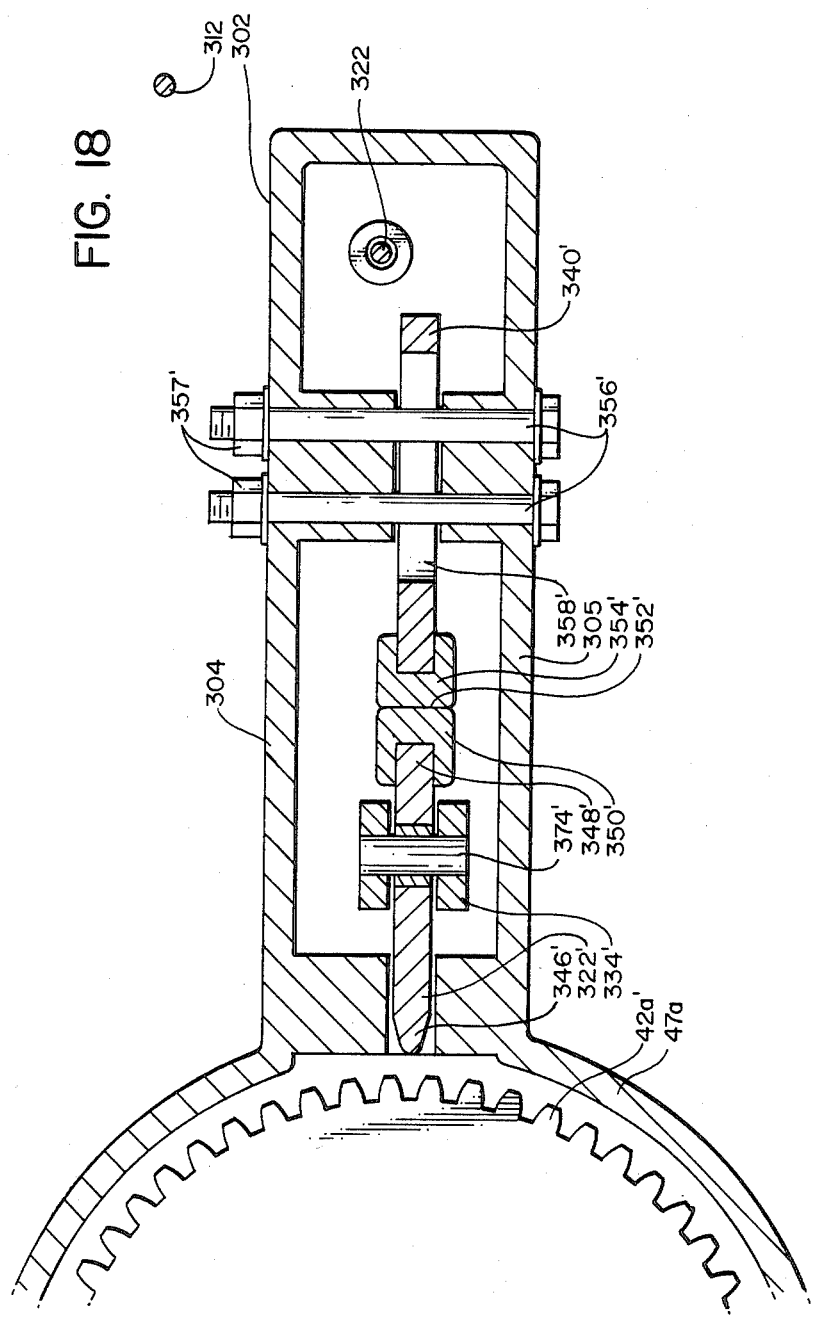
FIG. 18 is a sectional view taken along lines 18—18 of FIG. 16 and showing the quick turn assembly in a disengaged position.

In order to describe the quick turn and antispin assembly 300 in more detail, reference is made to FIG. 16 and 18 in which the locking wedges 332 are each slidably engaged within respective channels which are formed by elongated sidewalls 343 mounted parallel to centerline 338 on the lower surface of the housing top planar wall 304. To guide the locking wedges 332 into engagement with the spur gears 42a, the channels formed by the sidewalls 343 are aligned with the corresponding spur gear 42a and terminate inwardly adjacent to the outer circumference of the corresponding spur gear 42a.

Halting the rotation of the spur gear 42a is achieved by an inward wedged end 346 (FIG. 18) of each locking wedge 332. The wedged end 346 has a tapered configuration with a thickness dimension which is less than the distance between the individual teeth of the spur gear 42a. The outward end 348 of each locking wedge includes an engaging block 350 having an upper surface 352 (FIG. 19), which engages a complementary shaped lower surface of an engaging block 354 which is connected to the inward end of each locking rack 340. It is the inward movement of the engaging block 354 against the engaging block 352 which generates the locking action of the rocker arm 334 and the engagement of the locking wedge 332 with the spur gear 42a.

Each locking rack 340 is connected to the housing 302 by means of a pair of vertical bolts 356 which extend through opposite walls of the housing as shown in FIG. 18 and which are secured by nuts 357. The bolts 356 are engaged within an elongated slot 358 (FIG. 16) of each locking rack 340 so that the lengthwise axis of the slot 358 is parallel to centerline 338 to permit the inward and outward movement of the locking racks 340.

In order to generate the inward and outward movement of the locking racks 340, circular gear 327 has an annular base 359 and a stem portion 360 which extends in an outward direction from the base 359. The annular base 359 is rotatably mounted around a cylindrical hub portion 362 of the antispin arm 306 (FIG. 22). The rotation of the circular gear 327 in the horizontal plane is generated by the transverse movement of cable 322 which is connected to the upper end of stem 360 by a fastener 366. The rotation of circular gear 327 about hub 362 (FIG. 16) causes inward and outward movement of the locking racks 340 by means of the idler gears 342 including the left idler gear 342 which is engaged to (i) a row of linear gear teeth 368 which are mounted to the right side of the left gear rack 340 parallel to centerline 338 and (ii) an arcuate row of gear teeth 370 which are located at the left side of the circular gear 327. Likewise, the right idler gear 342' is engaged between the gear teeth 370' located on the right side of the circular gear 327 and the linear row of gear teeth 368' located at the left side of the right locking rack 340'. In order to perform the quick turn function of the present invention, the rocker arm 334 is pivotally connected at its left end to the left locking wedge 332 by a connector 374, and at its right end to locking wedge 332' by a pivot connector 374'.

The antispin function of the present invention is achieved by the engagement of the left and right spur gears 42a, 42a' by the left and right locking wedges 332, 332', respectively. This is accomplished by the counterclockwise rotation of the antispin actuating arm 306 to its engaged position shown in FIG. 19. The antispin arm 306 includes the inner axially extending hub portion 362 which is rotatably connected to a shaft of a central vertical bolt 376. Inward and outward movement of the rocker arm 334 so that the locking wedges 332 engage and disengage the spur gears 42a, is caused by the elongated transmitting arm 337 which has an outward end which is pivotally connected to actuating arm 306 at a location between bolt 376 and cable 312 by a pivot connector 384. Transmitting arm 337 has an inward end 385 (FIG. 22) to which the pivot pin 336 is pivotally connected; the pivot pin 336 being rigidly mounted to the rocker arm 334. Furthermore, the pivot pin 336 is slidably mounted at its opposite ends to opposing sockets 386, 387, which in turn are connected to the upper wall 304 and lower wall 305, respectively, of housing 302. The slots 386, 387 each have a lengthwise axis which is generally parallel to centerline 338 to permit movement of transmitting arm 337 in a manner parallel to centerline 338.

In order to cause locking wedges 332, 332' to move inward and engage spur gears 42a at a desired depth of approximately 0.010 inch below the outer surface of the teeth of spur 338 (FIG. 19), a pin 387 extends vertically from the upper surface of upper wall 304 to engage the antispin lever 306 and to prevent its further counterclockwise movement.

Figure 19:
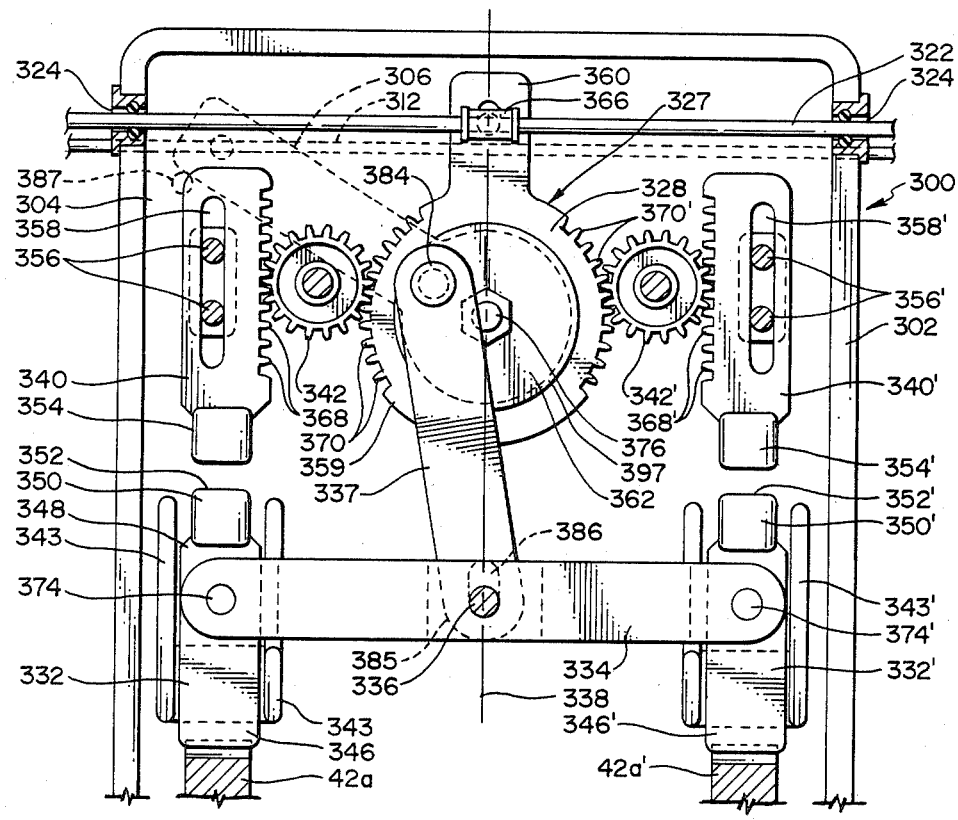
FIG. 19 is a view similar to FIG. 16 and showing the antispin assembly in an engaged position.

In operation, counterclockwise movement of the antispin actuating arm 306 from its disengaged position shown in FIG. 16 where it is parallel to centerline 338, to its engaged position shown in FIG. 19, causes the pivot connector 384 to move in a counterclockwise arcuate path, which in turn causes the transmitting arm 337 to move in a generally inward direction. In this manner, pivot pin 336 rides inward along slots 386, 387 (FIG. 22) to cause inward movement of rocker arm 334 so that the left, right locking wedges 332, 332', respectively, engage the left, right spur gears 42a, 42a', respectively.

Figure 20:
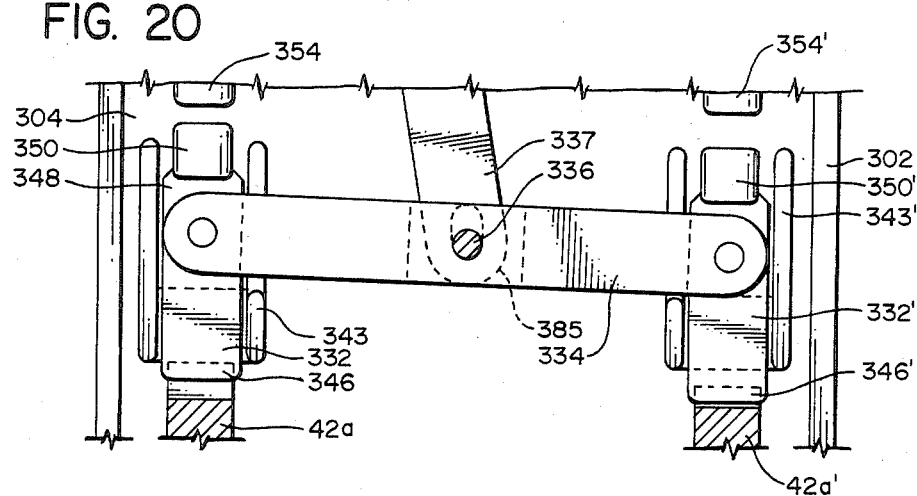
FIG. 20 is a partial view of the quick turn and antispin assembly showing the antispin assembly in another engaged position from that of FIG. 19.

Once engaged with the spur gears 42a, the rotational inertia of the rotating spur gears 42a cause the locking wedges 332 to be disengaged from the teeth of the spur gears 42a as shown in FIG. 20. There occurs a rapid rocking motion of the rocker arm 334 about the pivot pin 336 as each locking wedge 332 is engaged and disengaged from its respective spur gear 42a. For example, as the left locking wedge 332 is forced outward from the left spur gear 42a, a slight inward movement of the right locking wedge 332' toward the right spur gear 42a' is generated. As each tooth of the spur gear 42a impacts the right locking wedge 332', the locking wedge 332' is disengaged from the right spur gear 42a in an outward direction thus causing the left locking wedge 332 to move inward towards the left spur gear 42a. This rapid inward and outward rocking motion of the rocker arm 334, as the locking wedges 332 are engaged to and disengaged from the spur gears 42a, slows the rotation of the faster rotating spur gear 42a so that the rotational velocities of the left and right spur gears 42a become equalized.

As mentioned previously, a large difference in the traction between the left and right tracks may cause the track having the greater traction to be motionless, while the other track having the lesser traction spins without generating any forward propelling movement of the vehicle. In the present invention a positive traction to both tracks of the vehicle is generated.

To understand what occurs in the steerable differential 20 as a result of the aforementioned operation of the antispin lever 308, reference is made again to FIGS. 2 and 4. Prior to the operation of antispin lever 308 where one axle 22 is not rotating and the other axle 22 is spinning, the spinning axle rotates at a greater velocity, i.e. double its normal velocity, than when both axles are being driven and rotating at equal velocities. It should be kept in mind that when the cage 40 rotates at a constant velocity, any rotation of either axle 22 at a velocity faster or slower than that of the cage 40 will cause the corresponding roller gears 60 to rotate. In other words, the rotational velocity of the spur gear 42 on the spinning axle side decreases because the spinning axle rotates faster than the cage, and the corresponding roller gears 60 are caused to rotate in a direction opposite to the cage 40. On the other hand, the rotational velocity of the spur gear 42 on the nonspinning axle side increases because the cage 40 and the corresponding roller gears 60 on the nonspinning axle side are caused to rotate in the same direction as the cage 40. For example, if the left sun gear 70 and axle 22 (FIG. 2) are stationary and the right axle 22 is spinning, the left spur gear 42 is speeded up by the rotation of cage 40 relative to the stationary left axle and sun gear 70, which causes the left roller gears 60 to rotate in the same direction as the cage 40. The rotation of the left roller gears 60 in the same direction as the cage 40, increases the velocity of the left spur gear 42. On the other hand, the differential unit 50 causes the right sun gear 70 to rotate in the same direction as the cage 40, and at a greater velocity than cage 40, which causes the right roller gears 60 to rotate in a direction opposite to cage 40. This decreases the rotational velocity of the right spur gear 42.

In the present invention, by movement of the antispin actuating arm 306 and engagement of the left and right spur gears 42a, 42a' as shown in FIG. 19, the rocking motion of the rocker arm 334 causes the rotational velocities of the spur gears 42a, 42a' to be substantially equal, thus causing the left, right axles 22a, 22a' to rotate at substantially the same velocities. More specifically, when both the left and right spur gears 42a, 42a' are alternately engaged in a rapid rocking manner, the resulting decrease in rotational velocity of the higher speed spur gear, e.g. the left spur gear 42 (FIG. 2), as cage 40 continues to rotate at its same velocity, decreases the rotational velocity of the left spur gear 42 toward that of cage 40. This in turn reduces the velocities of the left roller gears 60 and imparts a forward rotation to the left sun gear 70 and left axle 22. The resulting increase in the velocity of the left axle 22 is transmitted via the differential unit 50 to cause a corresponding decrease in velocity of the right axle 22. This decrease in velocity of right axle 22 toward that of cage 40, reduces the rotational velocities of the right roller gears 60 which are rotating in a direction opposite to cage 40 and in turn causes an increase in velocity of right spur gear 42. When the left and right spur gears are caused to rotate at substantially the same velocities by the antispin actuating assembly 300, the total increase in velocity of the left axle 22, for example, and total decrease in velocity of the right axle 22, will be such that the left and right axles rotate at the same velocities.

Figure 21:
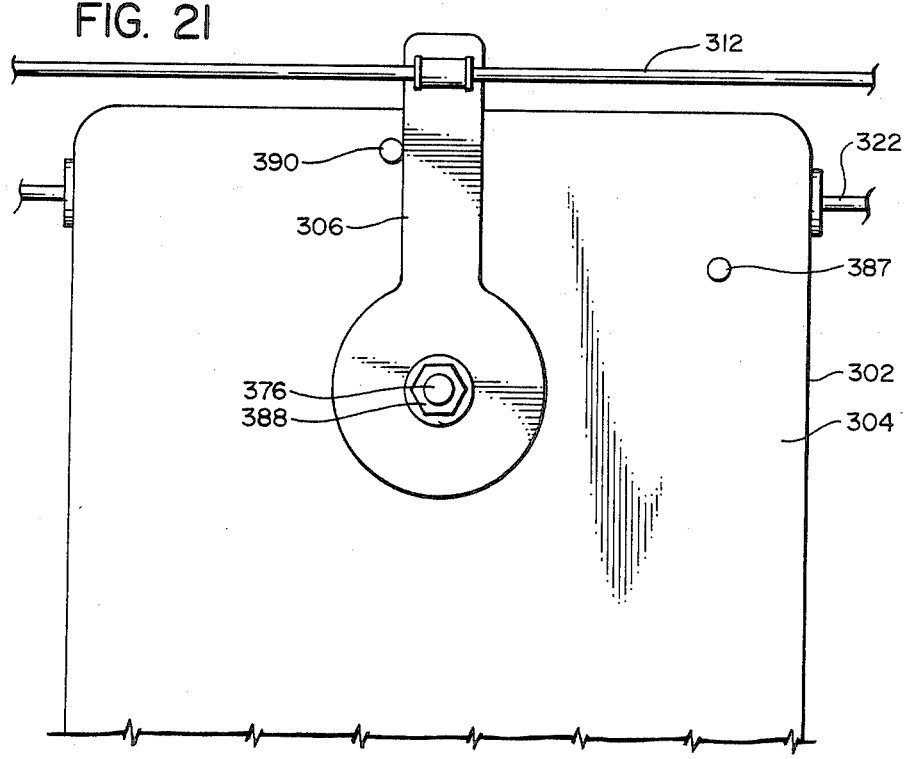
FIG. 21 is a top view of the housing for the quick turn and antispin assembly.

As shown in the top view of FIG. 21, the antispin actuating arm 306 is pivotally connected to the bolt 376 which extends through the upper surface of the housing top wall 304 by a nut 388. A stop pin 390 extends vertically from the upper surface of the top wall 304 to prevent any counterclockwise movement of the antispin actuating arm from the disengaged position.

Referring now to FIG. 22, there is shown in more detail the mounting of the circular gear 327 about the hub portion 362 of the antispin actuating arm 306. Movement of circular gear 327 independently of antispin actuating arm 306 is achieved by the mounting of the circular gear 327 about the cylindrical hub portion 362 as described previously. Circular gear 327 is supported on hub portion 362 by means of annular bearing 396 which extends around the outer circumference of the hub 362. In order to hold circular gear 327 on the hub 362, a washer 397, supported on bolt 376, is secured against the right side of the hub 362. The head of the bolt 376 is countersunk within washer 397 to allow positioning of the transmitting arm 337 against the right side of the washer 397 by means of pivot connector 384. Pivot connector 384 includes a shaft 400 which is pivotally connected to transmitting arm 337 and which extends through the washer and is press fit into a hole in the hub portion 362. In this manner, antispin arm 306 and hub 362 are permitted to rotate independently of circular gear 327. That is, movement of antispin arm 306 causes hub 362 to rotate within circular gear 327 to cause inward movement of transmitting arm 337. On the other hand, rotation of circular gear 327 on shaft 376 around hub 362 as a result of movement of quick turn lever 318 causes the aforementioned movement of locking racks 340 or 340' (FIG. 17) to provide the aforementioned quick turn action of the steerable differential.

What is claimed is:

1. In a vehicle having a lengthwise axis and a transverse axis which is perpendicular to the lengthwise axis, apparatus for receiving a drive input and for generating a drive output in response to the drive input in a manner to propel the vehicle in a selected direction, comprising:
   a. cage means which are operatively connected to the vehicle for rotation, in response to the drive input, at a first rotational velocity about a first axis which has a substantial alignment component which is parallel to said transverse axis;
   b. first and second axle means which rotate about said first axis in a manner to generate the drive output for propelling the vehicle in the selected direction;
   c. differential gear means
      (1) which are operatively connected to said cage means in a manner that rotation of said cage means about said first axis causes said differential gear means to rotate about said first axis, and
      (2) which are operatively connected to said first and second axle means in a manner that said rotation of said differential gear means causes said rotation of said first and second axle means to propel said vehicle;
   d. first and second outer gear means which rotate about said first axis; and
   e. first and second intermediate gear means,
      (1) which are operatively connected to said cage means for axial rotation about a second axis which has a substantial alignment component which is parallel to said transverse axis,
      (2) which are engaged to said first and second axle means, respectively, in a manner that axial rotation of said first intermediate gear means about said second axis causes an increase in the rotational velocity of the first axle means to cause the vehicle to turn in a first direction, and axial rotation of said second intermediate gear means about said second axis causes an increase in the rotational velocity of said second axle means to cause the vehicle to turn in a second direction, (3) which are engaged to said first and second outer gear means, respectively, for movement
  (a) in a first non-steering mode in which said first and second outer gear means are caused to rotate about said first axis at said first rotational velocity, and said first and second intermediate gear means are characterized by their nonrotation about said second axis, and
  (b) a second steering mode in which (i) said first outer gear means is caused to rotate at a velocity which is less than said first rotational velocity to cause said first intermediate gear means to rotate about said second axis and to cause said increase in the rotational velocity of said first axle means thereby causing said vehicle to turn in said first direction, and (ii) said second outer gear means is caused to rotate at a velocity which is less than said first rotational velocity to cause said second intermediate gear means to rotate about said second axis and to cause said increase in the rotational velocity of said second axle means and thereby cause said vehicle to turn in said second direction, f. means for reducing the rotational velocity of (i) said first outer gear means below said first rotational velocity to turn the vehicle in the first direction, and (ii) for reducing the rotational velocity of said second outer gear means below said first rotational velocity to turn the vehicle in the second direction, said velocity reducing means includes:
  (1) actuating means including a base having a first end and a second end, and a handle which is connected to the base for movement in a first transverse direction which has a substantial alingment component which is parallel to said lateral axis, and a second transverse direction which is generally opposite to said first transverse direction;
  (2) first and second braking gear means which are connected to said first and second ends of said base, respectively, which are adapted to engage said first and second outer gear means, respectively, to reduce said rotational velocity of said first and second outer gear means; and
  (3) means for mounting said based to said vehicle in a manner that (i) movement of said handle in said first transfer direction causes said first end of said base to descend in a manner that said first braking means engages said first outer gear means to reduce the rotational velocity of said first outer gear means and to cause the vehicle to turn in said first direction, and (ii) movement of said handle in said second direction causes said second end of said base to descend in a manner that said second braking means engages said second outer gear means to reduce the rotational velocity of said second outer gear means and to cause the vehicle to turn in said second direction.

2. The apparatus as set forth in claim 1 wherein:
a. said base is pivotally connected to said vehicle for movement about a first pivot axis;
b. said handle is pivotally connected to said base at a first location of said base for movement about a second pivot axis which is generally parallel to said first pivot axis; and
c. said actuating means includes displacing means which operatively connect said handle to said base at a second location of said base, said displacing means including a cam track which is adapted to receive a cam follower for movement therealong, said cam track including (i) a first end portion which is spaced from said first location a first distance, and a second end portion which is separated from said first location in a direction toward said second end of said base at a second distance which is greater than said first distance, so that during movement of said handle in said first transverse direction in a manner that said cam follower is caused to travel along said cam track from said first end portion to said second end portion, said second end of said base is caused to descend so that said second braking means engages said second outer gear means, (ii) a third end portion which is separated from said first location in a direction toward said first end of said base at a third distance which is greater than said first distance, in a manner that during movement of said handle in said second lateral direction in a manner that said cam follower is caused to travel along said cam track from said first end portion to said third end portion, said first end of said base is caused to descend so that said first braking means engages said first outer gear means.

3. The apparatus as set forth in claim 2 wherein:
a. each of said braking gear means is rotatably engaged to said base for rotation about a third rotational axis which has a substantial alignment component which is parallel to said transverse axis and which includes a first end gear portion which is adapted to engage said outer gear means in a manner that said rotation of said outer gear means causes a corresponding rotation of said braking gear means, and a second end portion;
b. said actuating means includes gear rack means which has a first engaging end and a second engaging end, and which is slidably engaged to said base for movement in said first and second transverse directions; and
c. said gear rack means is engaged to said handle in a manner that (i) said movement of said handle in said first transverse direction causes slidable movement of said gear rack means in said second transverse direction so that said second engaging end of said gear rack means engages said second end portion of said second braking gear means so as to inhibit said rotation of said second braking gear means when said first end gear portion of said second braking gear means is engaged to said second outer gear means, and (ii) said movement of said handle in said second transverse direction causes slidable movement of said gear rack means in said first transverse direction so that said first engaging end of said gear rack means engages said second end portion of said first braking gear means so as to inhibit said rotation of said first braking gear means when said first end gear portion of said first braking gear means is engaged to said first outer gear means.

4. The apparatus as set forth in claim 3 wherein said displacing means includes compression means having a first end which is attached to said base and a second end which is attached to said handle in a manner that (i) during movement of said handle in said first transverse direction said first end of said compression means is caused to move in said first transverse direction in a manner that said compression means generates a compression force which acts through said second end of said compression means to displace said first end of said base in an upward direction toward said second end of said compression means and which causes said second end of said base to descend toward said second outer gear means, and (ii) during movement of said handle in said second transverse direction said first end of said compression means is caused to move in said second transverse direction in a manner that said compression means generates a compression force which acts through said second end of said compression means to displace said second end of said base in a upward direction toward said first end of said compression means and which causes said first end of said base to descend toward said first outer gear means.

5. The apparatus as set forth in claim 4 wherein said actuating means includes retaining means which are operatively connected to said base and which are adapted to be engaged by said handle when said handle is moved in said first and second transverse directions in a manner that said retaining means is caused to engage said vehicle so as to rigidly connect said base to said vehicle to inhibit further pivotal movement of said base about said first pivot axis when said gear rack means engages said braking gear means.

6. In a vehicle having a lengthwise axis and a transverse axis which is perpendicular to the lengthwise axis, apparatus for receiving a drive input and for generating a drive output in response to the drive input in a manner to propel the vehicle in a selected direction, comprising:
   a. cage means which are operatively connected to the vehicle for rotation, in response to the drive input, at a first rotational velocity about a first axis which has a substantial alignment component which is parallel to said transverse axis;
   b. first and second axle means which rotate about said first axis in a manner to generate the drive output for propelling the vehicle in the selected direction;
   c. differential gear means
      (1) which are operatively connected to said cage means in a manner that rotation of said cage means about said first axis causes said differential gear means to rotate about said first axis, and
      (2) which are operatively connected to said first and second axle means in a manner that said rotation of said differential gear means causes said rotation of said first and second axle means to propel said vehicle;
   d. first and second outer gear means which rotate about said first axis; and
   e. first and second intermediate gear means,
      (1) which are operatively connected to said cage means for axial rotation about a second axis which has a substantial alignment component which is parallel to said transverse axis,
      (2) which are engaged to said first and second axle means respectively, in a manner that axial rotation of said firsts intermediate gear means about said second axis causes an increase in the rotational velocity of the first axle means to cause the vehicle to turn in a first direction, and axial rotation of said second intermediate gear means about said second axis causes an increase in the rotational velocity of said second axle means to cause the vehicle to turn in a second direction,
      (3) which are engaged to said first and second outer gear means, respectively, for movement
         (a) in a first non-steering mode in which said first and second outer gear means are caused to rotate about said first axis at said first rotational velocity, and said first and second intermediate gear means are characterized by their nonrotation about said second axis, and
         (b) a second steering mode in which (i) said first outer gear means is caused to rotate at a velocity which is less than said first rotational velocity to cause said first intermediate gear means to rotate about said second axis and to cause said increase in the rotational velocity of said first axle means thereby causing said vehicle to turn in said first direction, and (ii) said second outer gear means is caused to rotate at a velocity which is less than said first rotational velocity to cause said second intermediate gear means to rotate about said second axis and to cause said increase in the rotational velocity of said second axle means and thereby cause said vehicle to turn in said second direction,
   f. means (i) for stopping the rotation of said first outer gear means to quickly turn the vehicle in the first direction, and (ii) for stopping the rotation of the second outer gear means to quickly turn the vehicle in the second direction, said stopping means comprising:
      (1) first wedge means for engaging said first outer gear means in a manner to stop said rotation of said first outer gear means and to change the rotational velocity of said first outer gear means by a first amount, and a second wedge means for engaging said second outer gear means in a manner to stop said rotation of said second outer gear means and to change the rotational velocity of said second outer gear means by a second amount;
      (2) wedge actuating means including
         (i) a first arm having a first end to which said first wedge means is operatively connected, and a second end to which said second wedge means is operatively connected,
         (ii) first arm support means for supporting said first arm in a manner that when said first wedge means is engaged with said first outer gear means, said second wedge means is disengaged from said second outer gear means, and when said second wedge means is engaged with said second outer gear means, said first wedge means is disengaged from said first outer gear means,
         (iii) first locking means for moving said first end of said first arm in a manner to cause said first wedge means to engage said first outer gear means and to stop said rotation of said first outer gear means, and
         (iv) second locking means for moving said second end of said first arm in a manner to cause said second wedge means to engage said second outer gear means and to stop said rotation of said second outer gear means; and
      (3) drive gear means which are operatively connected to said first and second locking means in a manner that (i) movement of said drive gear means in a first direction causes said first locking means to move said first wedge means into said engagement with said first outer gear means, and (ii) movement of said drive gear means in a second direction causes said second locking means to move said second wedge means into said engagement with said second outer gear means.

7. The apparatus as set forth in claim 6 wherein:
a. said first and second intermediate gear means are engaged to (i) said first and second axle means, respectively, and (ii) to said first and second outer gear means, respectively, in a manner that
   (1) when said first wedge means is in said engagement with said first outer gear means the change in the rotational velocity of said first outer gear means by said first amount is greater than the first rotational velocity of said cage means so as to increase said rotational velocity in a first rotational direction by said first amount,
   (2) when said second wedge means is in engagement with said second outer gear means the change in the rotational velocity of said second outer gear means by said second amount is greater than the first rotational velocity of said first axle means so as to increase the rotational velocity of said second axle means by said second amount in a second rotational direction which is opposite to said first rotational direction; and
b. said differential gear means includes differentiating means which are operatively connected between said first axle means and said second axle means in a manner that (i) said increase in rotational velocity of said first axle means from said first rotational velocity in the first rotational direction by said first amount causes said second axle means to rotate in said second rotational direction so as to turn the vehicle in the first direction, and (ii) said change in the rotational velocity of said second axle means from said first rotational velocity in the first rotational direction by said second amount causes first axle means to rotate in the second rotational direction so as to turn the vehicle in the second direction.

8. In a vehicle having a lengthwise axis and a transverse axis which is perpendicular to the lengthwise axis, apparatus for receiving a drive input and for generating a drive output in response to the drive input in a manner to propel the vehicle in a selected direction, comprising:
a. cage means which are operatively connected to the vehicle for rotation, in response to the drive input, at a first rotational velocity about a first axis which has a substantial alignment component which is parallel to said transverse axis;
b. first and second axle means which rotate about said first axis in a manner to generate the drive output for propelling the vehicle in the selected direction;
c. differential gear means
   (1) which are operatively connected to said cage means in a manner that rotation of said cage means about said first axis causes said differential gear means to rotate about said first axis, and
   (2) which are operatively connected to said first and second axle means in a manner that said rotation of said differential gear means causes said rotation of said first and second axle means to propel said vehicle;
d. first and second outer gear means which rotate about said first axis; and
e. first and second intermediate gear means,
   (1) which are operatively connected to said cage means for axial rotation about a second axis which has a substantial alignment component which is parallel to said transverse axis,
   (2) which are engaged to said first and second axle means, respectively, in a manner that axial rotation of said first intermediate gear means about said second axis causes an increase in the rotational velocity of the first axle means to cause the vehicle to turn in a first direction, and axial rotation of said second intermediate gear means about said second axis causes an increase in the rotational velocity of said second axle means to cause the vehicle to turn in a second direction,
   (3) which are engaged to said first and second outer gear means, respectively, for movement
      (a) in a first non-steering mode in which said first and second outer gear means are caused to rotate about said first axis at said first rotational velocity, and said first and second intermediate gear means are characterized by their nonrotation about said second axis, and
      (b) a second steering mode in which (i) said first outer gear means is caused to rotate at a velocity which is less than said first rotational velocity to cause said first intermediate gear means to rotate about said second axis and to cause said increase in the rotational velocity of said first axle means thereby causing said vehicle to turn in said first direction, and (ii) said second outer gear means is caused to rotate at a velocity which is less than said first rotational velocity to cause said second intermediate gear means to rotate about said second axis and to cause said increase in the rotational velocity of said second axle means and thereby cause said vehicle to turn in said second direction,
f. means (i) for initiating rotation of said first axle means when said first axle means is not rotating and said second axle means is rotating due to a difference in traction between a surface and first and second track means of said vehicle which are operatively connected to said first and second axle means, respectively, said nonrotation of said first axle means causing said first outer gear means, and (ii) for initiating rotation of said second axle means when said second axle means is not rotating and said first axle means is rotating due to a difference in traction between said surface and said first and second track means, said nonrotation of said second axle means causing said second outer gear means to rotate at a greater velocity than said first outer gear means, said drive force generating means including
   (1) first wedge means for engaging said first outer gear means in a manner to reduce said rotational velocity of said first outer gear means, and a second wedge means for engaging said second outer gear means in a manner to reduce rotational velocity of said second outer gear means,
   (2) means for causing said first and second wedge means to engage said first and second outer gear means, respectively, in a manner to cause a reduction in said rotational velocity of the faster rotating of said first and second outer gear means, (3) said reduction in rotational velocity of said first outer gear means when said second axle means is rotating and said first axle means is nonrotating causing a reduction in velocity of said first intermediate gear means about said second axis to impart a rotation to said rotational velocity of said second axle means by said differential gear means, and (4) said reduction in rotational velocity of said second outer gear means when said first axle means is rotating and said second axle means is nonrotating causing a reduction in velocity of said second intermediate gear means to impart a rotation to said first axle means and to reduce said rotational velocity of said second axle means by said differential gear means.

9. The apparatus as set forth in claim 8 additionally comprising means (i) for stopping the rotation of said first outer gear means to quickly turn the vehicle in the first direction, and (ii) for stopping the rotation of said second outer gear means to quickly turn the vehicle in said second direction, said stopping means including
  a. wedge actuating means including
    (1) a first arm having a first end to which said first wedge means is operatively connected, and a second end to which said second wedge means is operatively connected,
    (2) first arm support means for supporting said first arm in a manner that when said first wedge means is engaged with said first outer gear means, said second wedge means is disengaged from said second outer gear means, and when said second wedge means is engaged with said second outer gear means, said first wedge means is disengaged from said first outer gear means,
    (3) first locking means for moving said first end of said first arm in a manner to cause said first wedge means to engage said first outer gear means in a manner to stop said rotation of said first outer gear means, and second locking means for moving said second end of said first arm in a manner to cause said second wedge means to engage said second outer gear means in a manner to stop said rotation of said second outer gear means,
  b. drive gear means which are operatively connected to said first and second locking means in a manner that (i) movement of said drive gear means in a first direction causes said first locking means to move said first wedge means into said engagement with said first outer gear means, and (ii) movement of said drive gear means in a second direction causes said second locking means to move said second wedge means into said engagement with said second outer gear means.

* * * * *